(12) United States Patent
Oshida et al.

(10) Patent No.: US 7,755,812 B2
(45) Date of Patent: Jul. 13, 2010

(54) IMAGE READING APPARATUS, AND IMAGE EXPANSION AND CONTRACTION CORRECTING METHOD

(75) Inventors: Haruhisa Oshida, Abiko (JP); Takeshi Aoyama, Abiko (JP); Shoko Magata, Toride (JP); Ayumu Murakami, Abiko (JP); Yuichi Yamamoto, Toride (JP); Takayuki Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 11/362,026

(22) Filed: Feb. 27, 2006

(65) Prior Publication Data

US 2006/0197997 A1    Sep. 7, 2006

(30) Foreign Application Priority Data

Mar. 2, 2005  (JP) .............................. 2005-057792

(51) Int. Cl.
*H04N 1/04* (2006.01)
*H04N 1/36* (2006.01)
*G03G 15/095* (2006.01)
*G03G 15/00* (2006.01)

(52) U.S. Cl. ....................... 358/496; 358/474; 358/475; 358/498; 358/412; 358/406; 358/408; 399/68; 399/208; 399/209; 399/364; 399/367; 399/374

(58) Field of Classification Search ................ 358/474, 358/496, 475, 497, 498, 509, 476, 412, 409, 358/408, 406; 399/68, 208, 209, 216, 364, 399/367, 74, 396

See application file for complete search history.

(56) References Cited

U.S. PATENT DOCUMENTS 5,278,675 A * 1/1994 Kamiyama ................... 358/486
5,995,801 A * 11/1999 Katsuta et al. ............... 399/367

(Continued)

FOREIGN PATENT DOCUMENTS

JP           11-258866         9/1999

(Continued)

OTHER PUBLICATIONS

Akiyama Mamoru, Automatic Document Feeder, Apr. 25, 2003, English Translation, JP 2003-125157.*

*Primary Examiner*—Twyler L Haskins
*Assistant Examiner*—Dennis Dicker
(74) *Attorney, Agent, or Firm*—Fitzpatrick, Cella, Harper & Scinto

(57) ABSTRACT

An image reading apparatus and an image expansion and contraction correcting method are provided that improve the quality of each read image by restraining image expansion and contraction caused by a variation in the combination of conveying units for conveying each document. The image reading apparatus has conveying units (a first conveying unit, a second conveying unit, and a third conveying unit) that convey each document, and an image reading unit (a first image reading unit and a second image reading unit) that reads an image of each document being conveyed by the conveying units. The image reading speed of the image reading unit is adjusted in accordance with a change in the combination of conveying units that are conveying a document, so as to correct image expansion and contraction caused by a change in document conveying speed caused by the change in the combination of conveying units.

3 Claims, 22 Drawing Sheets

U.S. PATENT DOCUMENTS

| | | | |
|---|---|---|---|
| 6,345,171 B1 * | 2/2002 | Suga | 399/396 |
| 6,678,076 B1 | 1/2004 | Hasegawa et al. | 358/496 |
| 6,845,979 B2 * | 1/2005 | Chiari et al. | 271/264 |
| 7,170,659 B2 * | 1/2007 | Jones | 358/496 |
| 7,454,150 B2 * | 11/2008 | Matsuda et al. | 399/68 |
| 7,463,392 B2 * | 12/2008 | Yamamoto et al. | 358/496 |
| 7,515,312 B2 * | 4/2009 | Murakami et al. | 358/461 |
| 7,616,911 B2 * | 11/2009 | Kietzman | 399/68 |
| 2004/0021913 A1 | 2/2004 | Aoyama et al. | 358/474 |
| 2004/0066544 A1 | 4/2004 | Suga et al. | 358/509 |
| 2004/0105133 A1 | 6/2004 | Murakami | 358/474 |
| 2006/0139700 A1 | 6/2006 | Murakami et al. | 358/474 |
| 2006/0227389 A1 | 10/2006 | Yamamoto et al. | 358/496 |
| 2007/0035083 A1 * | 2/2007 | Kawabata | 271/265.01 |
| 2007/0188825 A1 | 8/2007 | Suga | 358/474 |

FOREIGN PATENT DOCUMENTS

| | | |
|---|---|---|
| JP | 2000-115459 | 4/2000 |
| JP | 2003-125157 | 4/2003 |

* cited by examiner

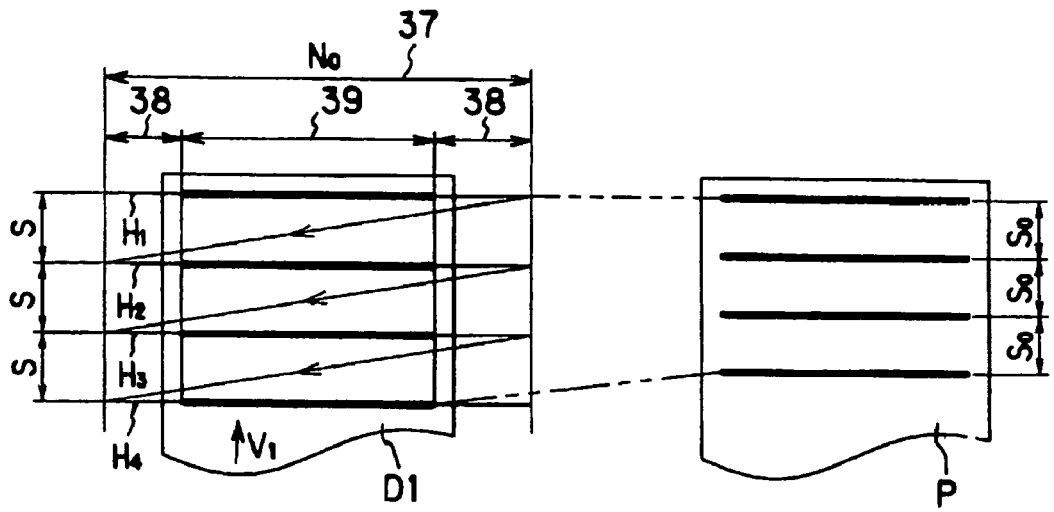
*Fig. 8A* *Fig. 8B*
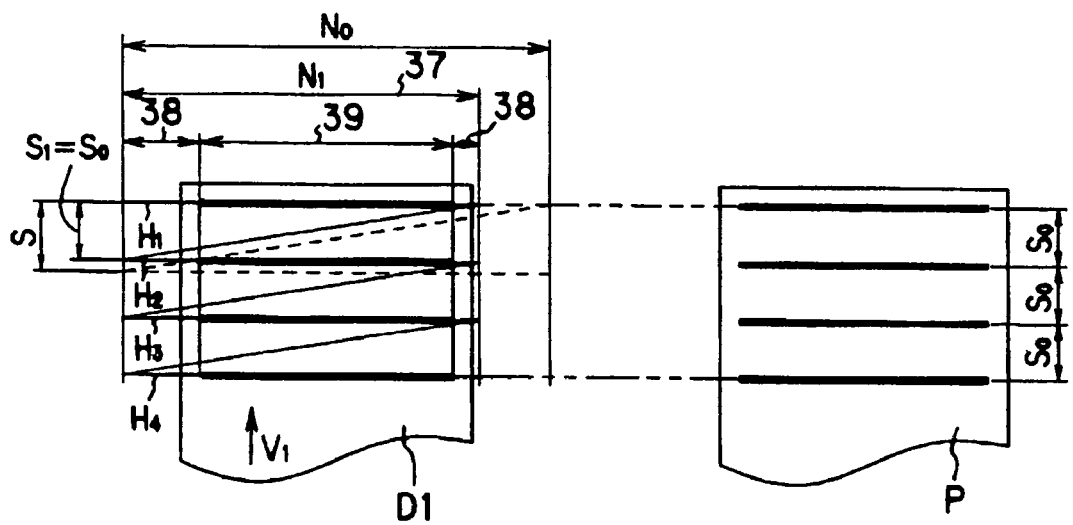
*Fig. 8C* *Fig. 8D*

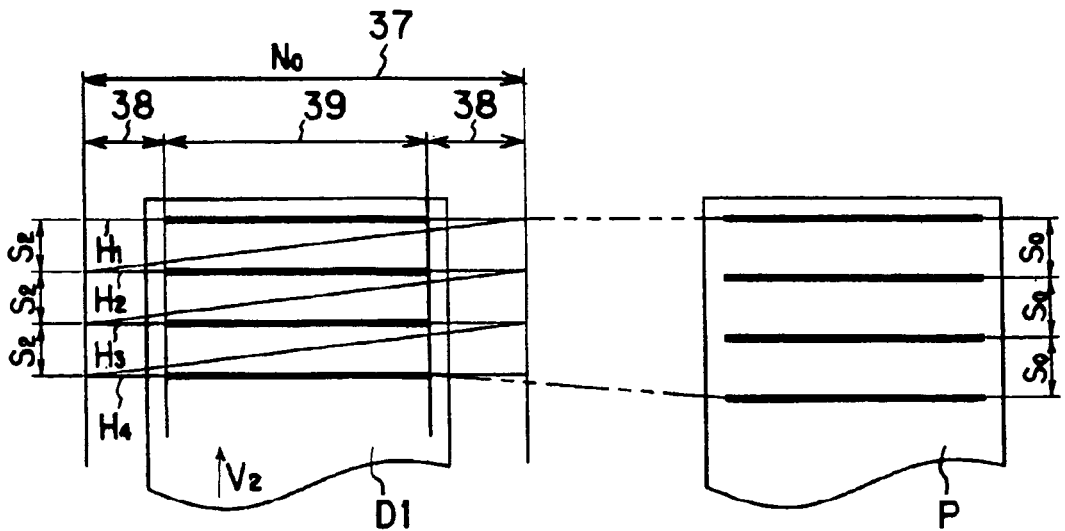
*Fig.9A*  *Fig.9B*
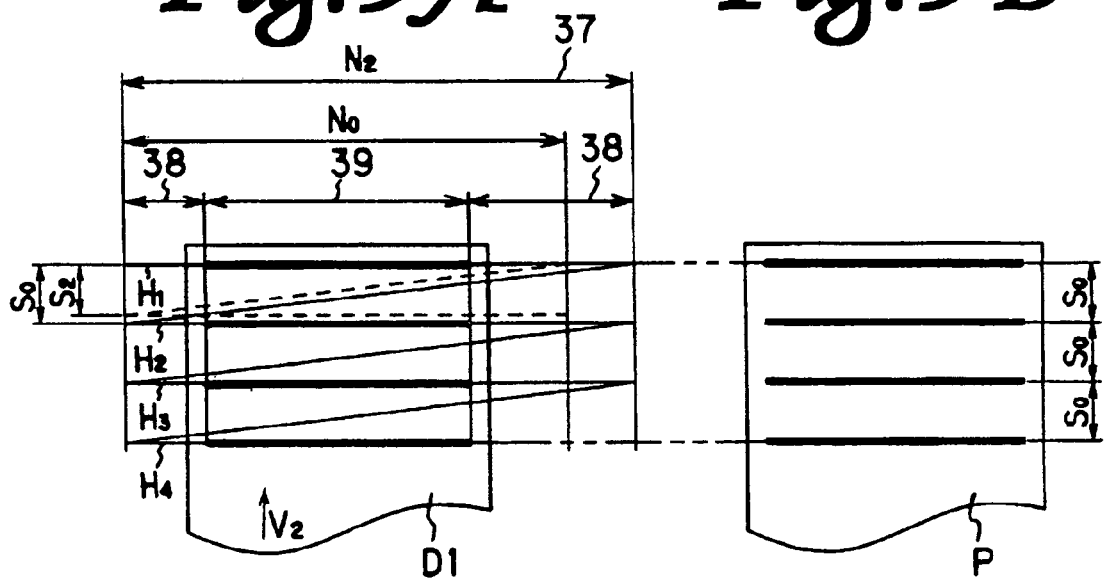
*Fig.9C*  *Fig.9D*

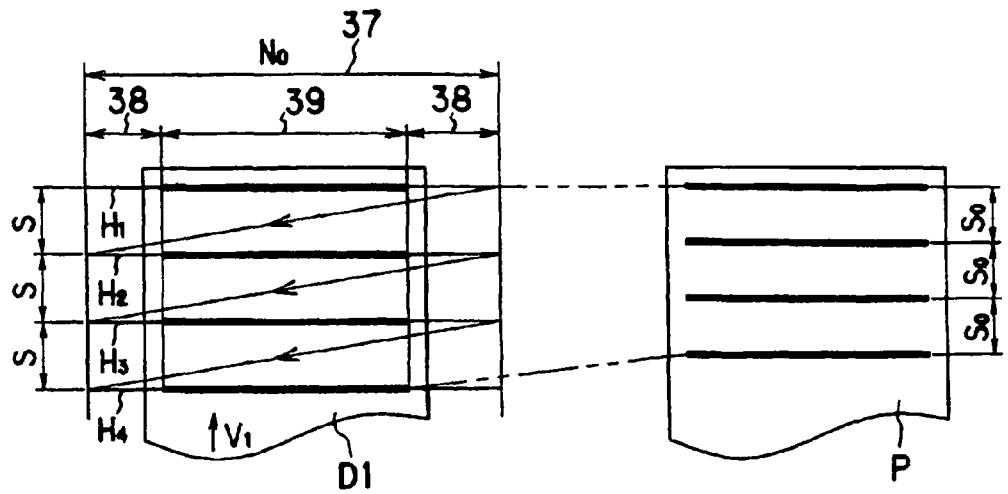
*Fig.11A*  *Fig.11B*
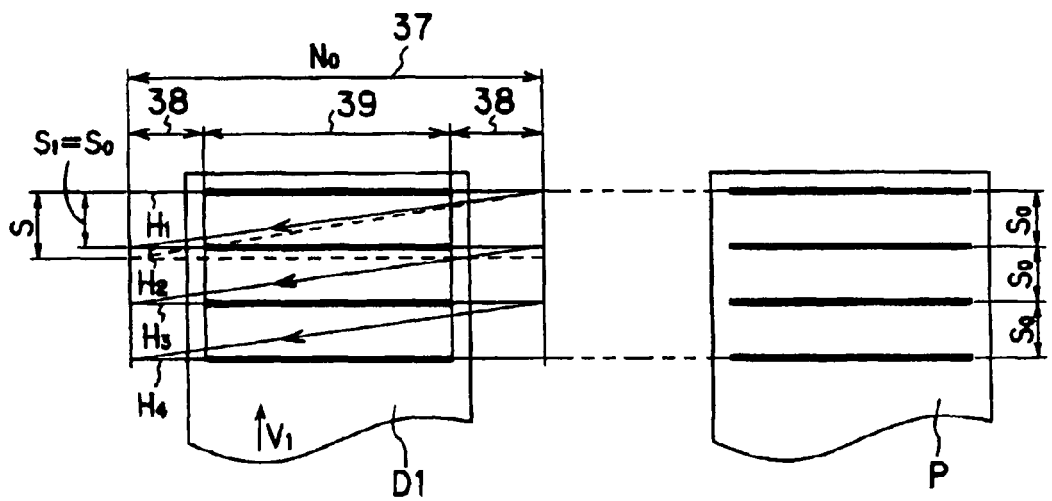
*Fig.11C*  *Fig.11D*

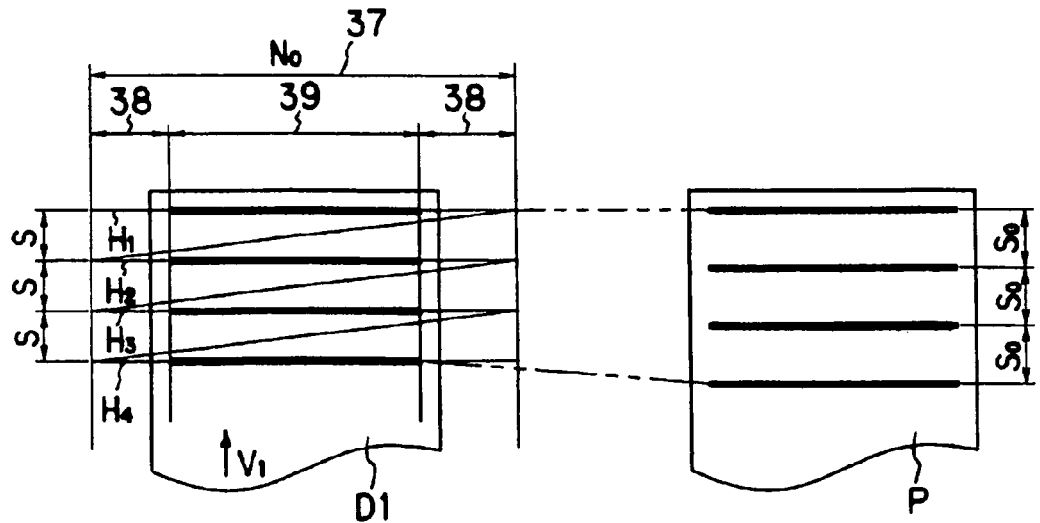
*Fig.12A*  *Fig.12B*
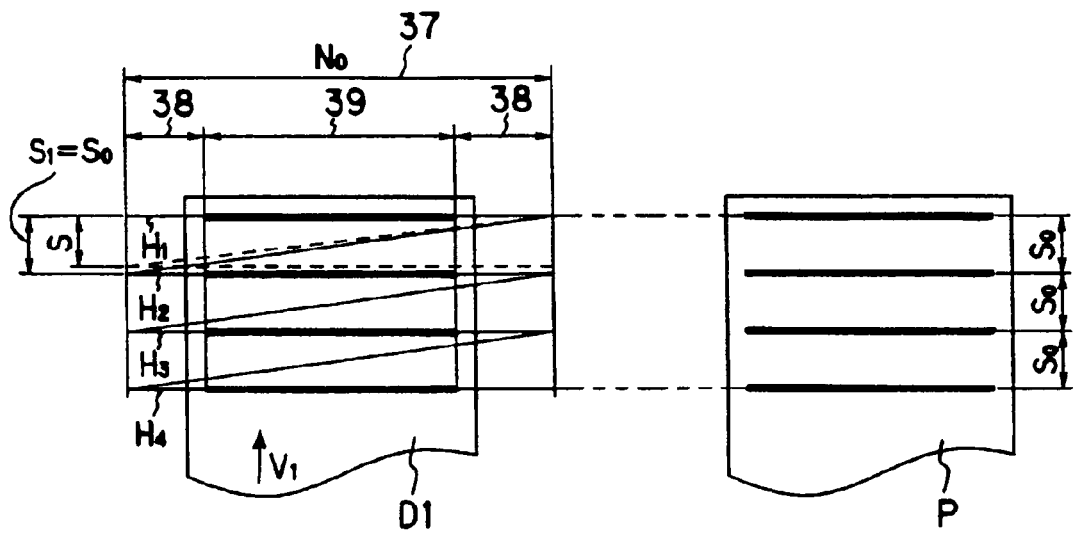
*Fig.12C*  *Fig.12D*

IMAGE READING APPARATUS, AND IMAGE EXPANSION AND CONTRACTION CORRECTING METHOD

BACKGROUND OF THE INVENTION

1. Field of the Invention

The present invention relates to an image reading apparatus and an image expansion and contraction correcting method that can be suitably implemented particularly in an operation of reading an image from a document that is being conveyed.

2. Description of the Related Art

Conventional image reading apparatuses that are mounted in copying machines and the likes include an image reading apparatus that reads image information from a document while moving the document with respect to a stationary image reading unit (such as a linear CCD). Referring to FIG. 20, an image forming apparatus equipped with a conventional image reading apparatus is described. FIG. 20 is a schematic view of the conventional image forming apparatus. In the following description, the "main scanning direction" generally means the direction perpendicular to the direction of conveying sheets (such as paper or film), and corresponds to the aligning direction of the photoelectric conversion elements of the linear CCD. Also, the direction perpendicular to the main scanning direction, which is the same as the sheet conveying direction, is the "sub-scanning direction".

As shown in FIG. 20, the image forming apparatus includes an image reading apparatus A and an image recording apparatus B. The image reading apparatus A is located above the image recording apparatus B.

The structure of the image reading apparatus A is as follows. The image reading apparatus A includes a document reading unit 1 that reads an image from a document stationarily placed on a platen glass 22, and an automatic document feeder (ADF) 2 placed above the document reading unit 1.

The document reading unit 1 has an image reading unit 121 placed below the platen glass 22. The image reading unit 121 can be moved along a guide rail 24 by virtue of a driving unit (not shown). With the image reading unit 121 moving in the direction of the arrow F, an image can be read from the document stationarily placed on the platen glass 22. A reading unit 101 for reading an image from each document being conveyed from the ADF 2 is provided at a location adjacent to the platen glass 22.

The image reading unit 121 includes an illuminating unit 21c for illuminating each document, a linear CCD (Charge Coupled Device) 21g, and an optical system 21f that focuses reflected light from each document surface onto the linear CCD 21g. The light emitted from the illuminating unit 21c and reflected by a document surface is focused onto the linear CCD 21g by the optical system 21f, so that the image information of the surface of the document is photoelectrically converted.

In the ADF 2, documents D1 placed on a document tray 12 are separated from one another by separating units 44a and 44b, and are rolled out by a pick-up roller 43 as a feeding unit. Each document D1 is then conveyed to the reading unit 101 by a first conveying unit 146. The reading unit 121 reads image information from one side of the document at the reading unit 101. The document from which an image has been read is further conveyed by a second conveying unit 148, and is discharged onto a document discharge tray 50. In general, the first conveying unit 146 and the second conveying unit 148 are driven by a common driving source, so as to reduce the size of the apparatus.

In a case where an image is to be read from a document while the ADF 2 is conveying the document, the image reading unit 121 remains stationary at the reading unit 101, and reads an image from a surface of the document while the document is being conveyed.

In a case where an image is to be read from a document placed on the platen glass 22, the image reading unit 121 is moved to a position immediately below the platen glass 22. While the image reading unit 121 is being moved by a driving unit (not shown), an image is read from a surface of the document.

The image recording apparatus B is now described. In the image recording apparatus B, an optical image based on image information is emitted from a recording optical system 3 onto a photosensitive drum 10 that is an image bearing member, so as to form an electrostatic latent image on the drum surface. A developing unit 11 then develops the electrostatic latent image formed on the photosensitive drum 10 with a toner. Thus, a toner image is formed.

In synchronization with the formation of the toner image, a recording sheet P is supplied from a recording sheet feeder 4 that is provided at the bottom of the main body. The recording sheet P is conveyed by a conveying unit 5, and the toner image is transferred onto the recording sheet P by a transfer unit 6. The recording sheet P is conveyed to a fixing unit 7 to fix the transferred toner image. The recording sheet P is then discharged onto a discharge tray 9 by a discharging unit 8. Since the series of image forming procedures by an electrophotographic technique are well known, explanation of them is omitted herein.

Referring now to FIG. 21 and FIGS. 22A through 22D, data processing of each read image is described. FIG. 21 is a block diagram of the image processor of a conventional image reading unit. FIGS. 22A through 22D illustrate the charge transfer from the linear CCD.

As is well known, the linear CCD 21g has a number of photoelectric conversion elements G aligned in the main scanning direction. The photoelectric conversion elements constitute pixels $G_1, G_2, G_3, \ldots G_n$ that read images. The linear CCD 21g is designed to read the data of each one line in the main scanning direction of each document, photoelectrically convert the data, and output the converted data as an image signal. When the linear CCD 21g receives light reflected by a document, charges representing the image information of the document are accumulated in the respective photoelectric conversion elements G (see FIG. 22A). Although all the charges accumulated in the reading pixels $G_1, G_2, G_3, \ldots G_n$ are denoted by $e_1$ in FIG. 22A, the charges accumulated in the respective reading pixels in practice have different charge amounts from one another in accordance with the image information of the document.

The charges accumulated in the respective reading pixels are collectively sent to a CCD analog register 71 (see FIG. 22B), and are then transferred to an analog signal processor 72 one by one by virtue of predetermined transfer pulses, while moving from one register cell to another neighboring register cell in the CCD analog register 71 (see FIG. 22C). After all the charges of the pixels are transferred to the analog signal processor 72, accumulated charges are collectively sent to the CCD analog register 71 (see FIG. 22D), and are transferred to the analog signal processor 72 one by one by virtue of predetermined clock pulses while moving from one register cell to another neighboring register cell (see FIG. 22C). This operation is repeated. Although all the charges accumulated in the reading pixels $G_1, G_2, G_3 \ldots G_n$ are denoted by $e_2$ in FIG. 22D, the charges accumulated in the respective reading pixels in practice have different charge amounts from one another in accordance with the image information of the document.

The analog signal processor 72 converts the transferred charges into an analog image signal by replacing the charges with voltage values. After various corrections such as a sensitivity correction are performed, an A-D converter 73 converts the analog image signal into a digital image signal. Further corrections are performed at a gain controller 74, a shading corrector 75, a tone controller 76, and the likes. The image data is then temporarily stored as the digital data of one line in a buffer memory 77. The image data is then read out to the image recording apparatus B.

When the transfer of the charges of one line to the CCD analog register 71 is completed in the above described operation, the image data of the next line is read in. However, through the above procedure, the document has moved in the sub-scanning direction with respect to the image reading unit 121, and the image of the second line is an image at a different location from the image of the first line in terms of the sub-scanning direction. The distance between the first line and the second line is predetermined in accordance with the reading resolution in the sub-scanning direction.

In the image recording apparatus B, image formation is performed on assumption that the read image data has been read at a predetermined reading resolution. Therefore, the CCD transfer pulse frequency, the number of transfer pulses, and the document conveying speed are determined so that each reading line interval (the sub-scanning interval) S becomes equal to a predetermined value in the document reading unit 1. Thus, image expansion and contraction are prevented in a recorded image.

If the document conveying speed becomes different from an ideal conveying speed due to a variation in the diameters of the rollers that are conveying a document in the above described structure, the reading line interval S in the sub-scanning direction becomes different from the predetermined value, resulting in image expansion and contraction. In such a case, the number of rotations of the driving motor that is driving the document conveying rollers is adjusted to optimize the document conveying speed and eliminate the read image expansion and contraction.

In recent years, image reading apparatuses that can read the image information from both sides of a document at once have been developed. Referring now to FIGS. 1 and 2, the structure of an image forming apparatus equipped with such an image reading apparatus is described.

As shown in FIG. 1, the image reading apparatus A includes a first image reading unit 21 and a second image reading unit 41. The first image reading unit 21 is to read one side of each document, having a first illuminating unit 21c that illuminates documents, an optical system 21f that is formed with mirrors 21d and an image focusing lens 21e, and a linear CCD 21g. The first image reading unit 21 is located below a platen glass 22 on which a document is placed. In the first image reading unit 21, the light emitted from the first illuminating unit 21c and reflected by a document face is focused onto the line CCD 21g to photoelectrically convert the information of the image on one side of the document.

The first image reading unit 21 can be moved by a driving unit (not shown), and can read an image from a document stationarily placed on the platen glass 22 while moving in the direction of the arrow F.

The second image reading unit 41 is to read the other side of each document, and includes a second illuminating unit 41c, an optical system 41f formed with mirrors 41d and an image focusing lens 41e, and a linear CCD 41g. The second image reading unit 41 is fixed at a predetermined location in an automatic document feeder (ADF) 40. In the second image reading unit 41, the light emitted from the second illuminating unit 41c and reflected by a document face is focused onto the CCD 41g by the optical system 41f, and the information of the image of the other side of the document is photoelectrically converted.

In the ADF 40, documents D1 stacked on a document tray 12 are separated from one another by separating units 44a and 44b, and are rolled out by a pick-up roller 43 serving as a feeding unit. Each document D1 is then conveyed to a first reading device by a first conveying unit 46. The first image reading unit 21 reads image information from one side of the document at the location of the first reading device. The document from which the image of one side has been read is further conveyed to a second reading device by a second conveying unit 48. The second image reading unit 41 reads image information from the other side of the document at the location of the second reading device. The document from which the image of the other side has also been read is discharged onto a document discharge tray 50 by a third conveying unit 51.

In a case where images are to be read from both sides of a document, the first image reading unit 21 is fixed to the first reading device. The document is conveyed by the ADF 40, and, during the conveyance, the first image reading unit 21 and the second image reading unit 41 read the images from both sides of the document.

In a case where a document placed on the platen glass 22 is to be read, the first image reading unit 21 is moved to a location immediately below the platen glass 22. The first image reading unit 21 then reads an image from one side of the document while being moved by a driving unit (not shown).

A technique related to the above is disclosed in Japanese Unexamined Patent Publication No. 11-258866 (Patent Document 1).

In an image reading apparatus, a document is conveyed by conveying units (or pairs of conveyance rollers). During the conveyance of a document, the combination of conveying units that are conveying the document changes in order. There are variations in roller diameter, rotation speed, and friction coefficient among the conveying units within the size tolerance of each component. Therefore, the document conveying speed is varied as the combination of conveying units changes. Theoretically, it is possible to prevent a change in document conveying speed by adjusting the conveying speed of each conveying unit. However, this is not a realistic approach, because the structure needs to become much more complicated so as to adjust the conveying speed of each conveying unit.

A change in document conveying speed during a document reading operation leads to expansion and contraction of the read image. Especially, in a structure having two image reading units for reading both sides of each document, the expansion and contraction of the image read from one side of a document differs from the expansion and contraction of the image read from the other side of the document. In the following, this problem is described in greater detail.

As described above, in the image reading apparatus that can read images from both sides of a document at once, the document conveying speed during a reading operation performed by the first image reading unit 21 is controlled mostly by the first conveying unit 46 and the second conveying unit 48. Meanwhile, the document conveying speed during a reading operation performed by the second image reading unit 41 is controlled mostly by the second conveying unit 48 and the third conveying unit 51. So as to eliminate a difference in image expansion and contraction between the front side and the back side of a document, the document conveying speed during the reading operation performed by the first image reading unit 21 and the document conveying speed during the reading operation performed by the second image reading unit 41 need to be made equal to each other.

However, it is difficult to have equal document conveying speeds among the first conveying unit 46, the second conveying unit 48, and the third conveying unit 51. For example, in a case where the first conveying unit 46, the second conveying unit 48, and the third conveying unit 51 are driven with the same driving source, there are slight differences in document conveying speeds, because the roller diameters of those conveying units are different from one another within the size tolerance or there are slight differences in pressure force among the pressure springs less than a given value for putting each pair of rollers into pressure contact with each other, even though the same pair of rollers are used for the first conveying unit 46, the second conveying unit 48, and the third conveying unit 51.

As a result, a difference in expansion and contraction rate in the sub-scanning direction is caused between the image read by the first image reading unit 21 and the image read by the second image reading unit 41. In the case where the conveying units are driven with the same driving motor, the difference in expansion and contraction rate between the two sides of a document cannot be eliminated by adjusting the number of rotations of the driving motor.

Alternatively, when an image is read from a document that is being conveyed, tension may be purposely applied to the document being conveyed. More specifically, the conveying speed of the conveying unit located on the downstream side of the reading position is made slightly higher than the conveying speed of the conveying unit located on the upstream side of the reading position, so as to apply tension to the document. With tension being applied to the document, the position of the document being read is secured in the sheet path, and image deformation and defocusing are prevented. However, since the conveying speed of the roller on the downstream side is higher in this case, a difference in expansion and contraction rate in the sub-scanning direction is caused between the image read by the first image reading unit 21 from one side of the document and the image read by the second image reading unit 41 from the other side of the document.

SUMMARY OF THE INVENTION

Therefore, the object of the present invention is to provide an image reading apparatus and an image expansion and contraction correcting method that can increase the quality of each read image by restraining, during the conveyance of each document, read image expansion and contraction caused by a change in the combination of conveying units that are conveying the document.

To achieve above-mentioned object, the first aspect of the present invention provides an image reading apparatus comprising: a plurality of conveying units that convey a document; and an image reading unit that reads an image from the document being conveyed by the conveying units, the image reading unit having an image reading speed adjusted in accordance with a change in the combination of conveying units conveying the document, so that read image expansion or contraction due to a change in document conveying speed caused by the change in the combination of conveying units can be corrected while the document is being conveyed.

Additionally, according to a second aspect of the invention, there is provided an image reading apparatus comprising: a plurality of conveying units that convey a document; a first image reading unit that reads an image from one side of the document that is being conveyed by the conveying units; and a second image reading unit that reads an image from the other side of the document, at least one of the first image reading unit and the second image reading unit having an image reading speed adjusted, so that expansion or contraction of a read image can be corrected, the expansion or contraction of the read image being due to a change in document conveying speed caused by the difference between the combination of conveying units conveying the document during a reading operation performed by the first image reading unit and the combination of conveying units conveying the document during a reading operation performed by the second image reading unit.

Additionally, according to a third aspect of the invention, there is provided an image reading apparatus comprising: a plurality of conveying units that convey a document; and an image reading unit that reads an image from the document being conveyed by the conveying units, the image reading unit being designed to be movable, the image reading unit reading the image while moving so as to absorb a change in relative speed between the image reading unit and the document during the conveyance of the document, in accordance with a change in document conveying speed caused by a change in the combination of conveying units that are conveying the document.

Additionally, according to a fourth aspect of the invention, there is provided an image reading apparatus comprising: a plurality of conveying units that convey a document; a first image reading unit that can read an image from a document in a stationary state on an original base plate, and also can read an image from one surface of a document that is being conveyed by the conveying units, the first image reading unit being designed to be movable; and a second image reading unit that reads an image from the other surface of the document being conveyed by the conveying units, the first image reading unit reading the image while moving, so that the relative speed between the first image reading unit and the document and the relative speed between the second image reading unit and the document become equal to each other, in accordance with a change in document conveying speed caused by the difference between the combination of conveying units conveying the document during a reading operation performed by the first image reading unit and the combination of conveying units conveying the document during a reading operation performed by the second image reading unit.

Additionally, according to a fifth aspect of the invention, there is provided an image expansion and contraction method, comprising the step of adjusting an image reading speed of an image reading unit in accordance with a change in document conveying speed caused by a change in combination of conveying units conveying the document, so as to correct read image expansion and contraction caused by the change in the combination of conveying units, when the image reading unit reads an image of the document being conveyed by a plurality of conveying units.

Additionally, according to a sixth aspect of the invention, there is provided an image expansion and contraction method, comprising the step of adjusting an image reading speed of at least one of a first image reading unit and a second image reading unit in accordance with a variation in document conveying speed caused by the difference between the combination of conveying units conveying the document during a reading operation performed by the first image reading unit and the combination of conveying units conveying the document during a reading operation performed by the second image reading unit, so as to correct read image expansion and contraction caused by the change in the combination of conveying units, when the first image reading unit and the second image reading unit read images from both sides of the document being conveyed by a plurality of conveying units.

Additionally, according to a seventh aspect of the invention, there is provided an image expansion and contraction method, comprising the step of absorbing a change in relative speed between an image reading unit and a document by reading an image of the document with an image reading unit moving in accordance with a change in document conveying speed caused by a change in combination of conveying units conveying the document, so as to correct read image expansion and contraction caused by the change in the combination of conveying units, when the image reading unit reads the image of the document being conveyed by a plurality of conveying units.

Additionally, according to a eighth aspect of the invention, there is provided an image expansion and contraction method, comprising the step of equalizing a relative speed between a first image reading unit and a document and a relative speed between a second image reading unit and the document by moving at least one of the first image reading unit and the second image reading unit to read images in accordance with a variation in document conveying speed caused by the difference between the combination of conveying units conveying the document during a reading operation performed by the first image reading unit and the combination of conveying units conveying the document during a reading operation performed by the second image reading unit, so as to correct read image expansion and contraction caused by the variation in the combination of conveying units, when the first image reading unit and the second image reading unit read the images from both sides of the document being conveyed by a plurality of conveying units.

In accordance with the present invention, read image expansion and contraction caused by a variation in the combination of conveying units that are conveying a document can be restrained, and the quality of each read image can be increased.

BRIEF DESCRIPTION OF THE DRAWINGS

The invention, together with further advantages thereof, may best be understood by reference to the following description taken in conjunction with the accompanying drawings in which:

FIGS. 8A through 8D illustrate the relationship between the reading position for each one main-scanning line on a document and the recording position for recording an image on a sheet based on the read data, in a case where the document conveying speed is higher than an ideal document conveying speed;

FIGS. 9A through 9D illustrate the relationship between the reading position for each one main-scanning line on a document and the recording position for recording an image on a sheet based on the read data, in a case where the document conveying speed is lower than the ideal document conveying speed;

FIGS. 11A through 11D illustrate the relationship between the reading position for each one main-scanning line on a document and the recording position for recording an image on a sheet based on the read data, in a case where the document conveying speed is higher than an ideal document conveying speed, in accordance with a second embodiment of the present invention;

FIGS. 12A through 12D illustrate the relationship between the reading position for each one main-scanning line on a document and the recording position for recording an image on a sheet based on the read data, in a case where the document conveying speed is lower than the ideal document conveying speed, in accordance with the second embodiment of the present invention;

DESCRIPTION OF THE PREFERRED EMBODIMENTS

Figure 1:
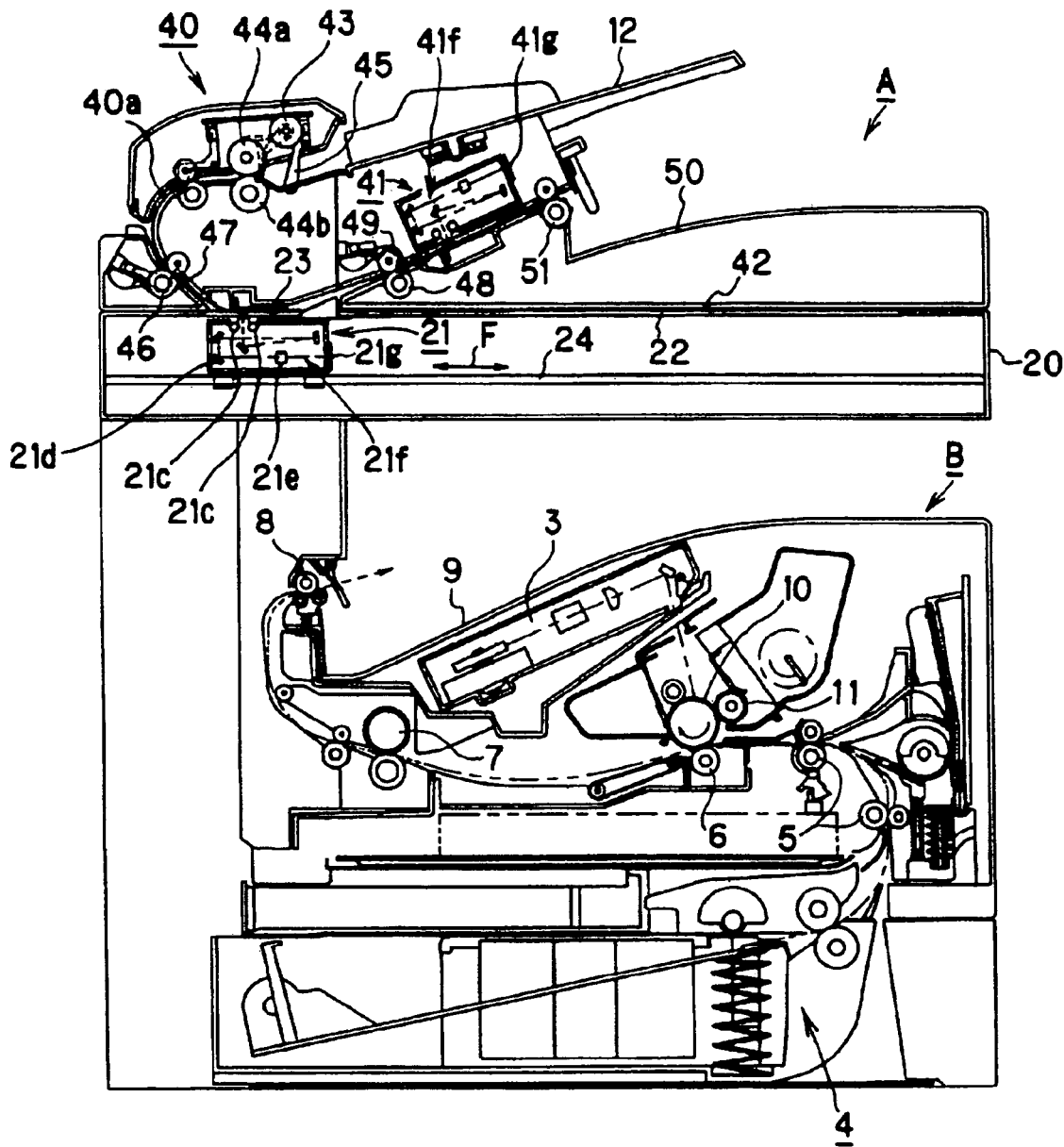
FIG. 1 is a schematic view of an electrophotographic copying machine in accordance with an embodiment of the present invention.

The following is a description of embodiments of the present invention, with reference to the accompanying drawings. In the drawings illustrating the embodiments, like components are denoted by like reference numerals. It should be noted that the sizes, materials, shapes, and relative locations of the components of the following embodiments are not limited to those described below, unless otherwise specified.

Referring now to FIGS. 1 through 10, an image reading apparatus and an image expansion and contraction correcting method in accordance with a first embodiment of the present invention are described. In the following embodiments, image reading apparatuses implemented in electrophotographic copying machines will be described in detail. Also, explanation is made in the following order: (1) the entire structure of an electrophotographic copying machine; (2) an image reading apparatus; and (3) a method of correcting the difference caused by image expansion and contraction between read images of the surface and the back surface of each document. The fundamental structure and functions of the image forming apparatus for recording information are the same as those of the prior art, and therefore, explanation of them is omitted herein.

(1) Entire Structure of Electrophotographic Copying Machine

Figure 2:
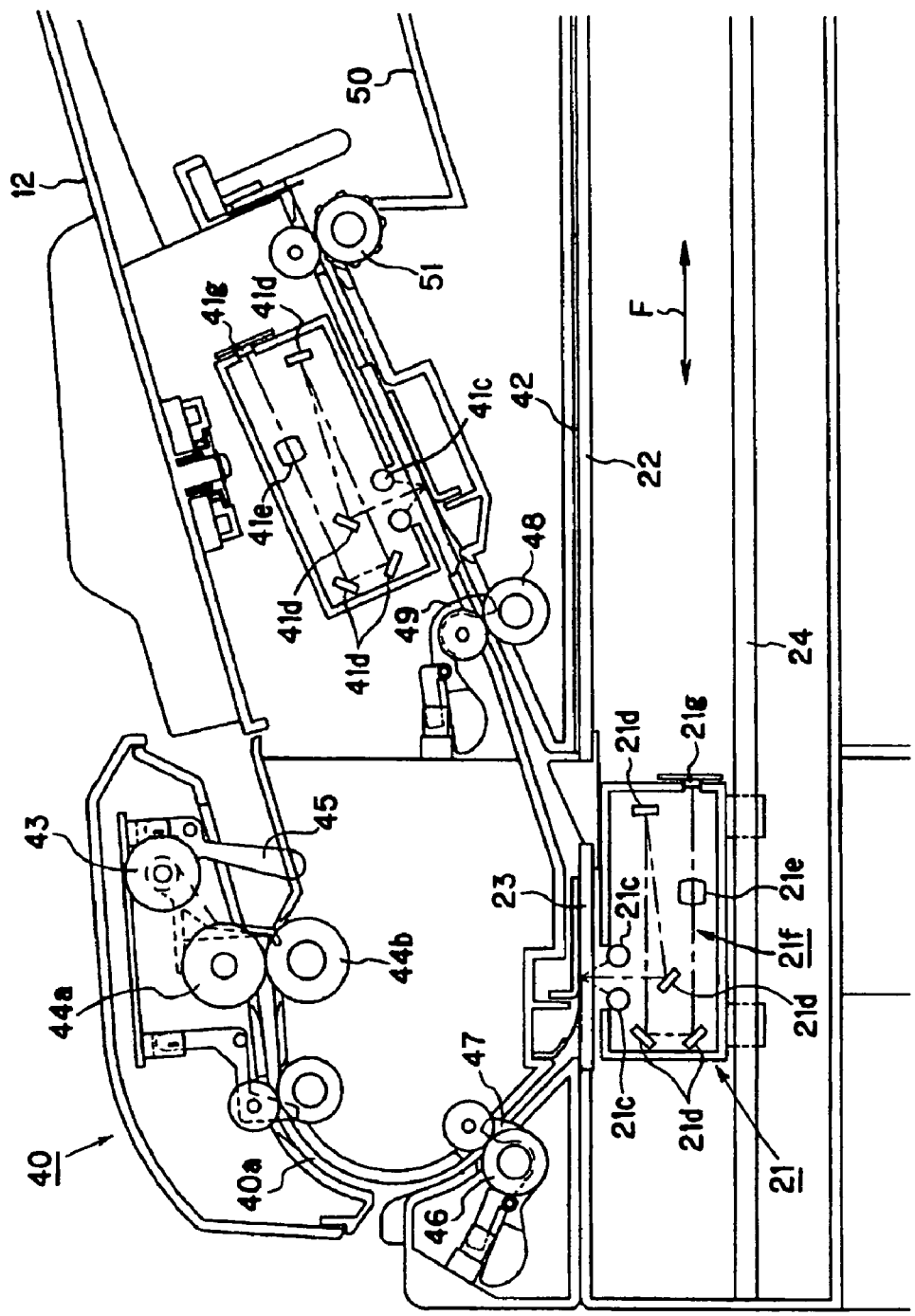
FIG. 2 is an enlarged view of the essential part of the machine illustrated in FIG. 1.

Referring to FIGS. 1 and 2, the entire structure of an electrophotographic copying machine is described. FIG. 1 is a schematic cross-sectional view of the structure of an electrophotographic copying machine in accordance with this embodiment. FIG. 2 is an enlarged view of the image reading apparatus part of the electrophotographic copying machine shown in FIG. 1.

As shown in the drawings, this electrophotographic copying machine has an image reading apparatus A in the upper part of the machine, and an image recording apparatus B in the lower part of the machine. To make a copy of a document, the image recording apparatus B records the information of the image of the document read by the image reading apparatus A. To scan a document, the information of the image of the document read by the image reading apparatus A is stored in an image memory provided in the machine or in an external device such as a PC.

The image reading apparatus A reads the information of each document image, and has a reading base 20 equipped with a platen glass 22, and an automatic document feeder (hereinafter referred to as the ADF) 40 placed above the reading base 20. The ADF 40 has a rotational axis unit on the back side of the machine. When the front side of the ADF 40 is lifted up, the platen glass 22 widely opens at the front end of the machine. The image reading apparatus A includes a first image reading unit 21 on the side of the reading base 20 and a second image reading unit 41 on the side of the ADF 40.

The image reading apparatus A operates in one-side ADF mode, two-side ADF mode, and BOOK mode. In the one-side ADF mode, documents placed on a document tray 12 are conveyed one by one, and images are read by the first image reading unit 21 that is stopped at a predetermined location. In the two-side ADF mode, documents placed on a document tray 12 are conveyed one by one, and images are read by both the first image reading unit 21 and the second image reading unit 41 that are stopped at predetermined locations. In the BOOK mode, images of documents placed on the platen glass 22 are read by the first image reading unit 21 that is moving.

(2) Image Reading Apparatus

Figure 3:
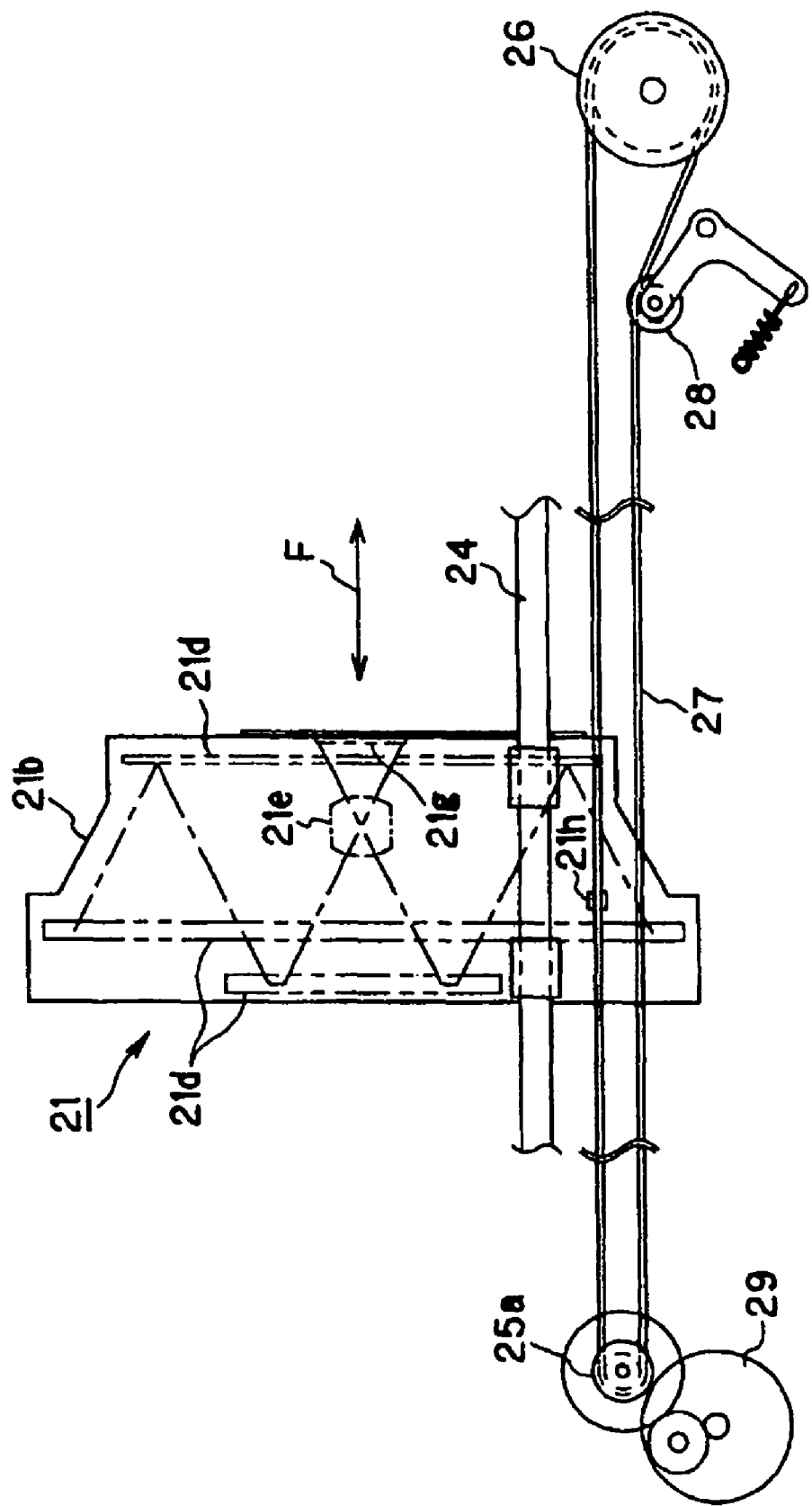
FIG. 3 is a schematic view of the driving mechanism of an image reading unit.

Referring now to FIGS. 1 through 3, the structure and operation of the image reading apparatus A are described. FIG. 3 is a schematic view of the driving mechanism of an image reading unit. As described above, the image reading apparatus A includes the reading base 20 equipped with the platen glass 22, and the ADF 40 that is placed above the reading base 20. On the lower face of the ADF 40, a white plate 42 is provided for putting each document onto the platen glass 22 at the time of BOOK-mode reading. With its hinge (not shown) serving as the center of rotation, the ADF 40, together with the white plate 42, can be opened and closed.

On the upper surface of the reading base 20, the platen glass 22 and a reading glass 23 are provided. The reading glass 23 is designed so that images can be read by the first image reading unit 21 in the ADF mode. The reading glass 23 is placed on the upstream side of the platen glass 22 in the document conveying direction. Below the platen glass 22, the first image reading unit 21 is placed in such a manner as to be able to move along a guide rail 24. The first image reading unit 21 has a fixing portion 21h attached to a timing belt 27. The timing belt 27 has no ends, bridging pulleys 25a and 26. The pulley 25a is rotated by virtue of the driving force supplied from a driving motor 29, so that the first image reading unit 21 moves in the direction of the arrow F shown in the drawings. In FIG. 3, reference numeral 28 indicates a tensioner that applies tension to the timing belt 27.

The ADF 40 has a U-shaped document conveying path (hereinafter referred to as the U-turn path) 40a. The components provided on the upstream side of the U-turn path 40a are: a pick-up roller 43 that is in contact with documents placed on the document tray 12 and rolls out the documents; a separation roller 44a and a reverse roller 44b that are in pressure contact with each other so as to separate the rolled-out documents from one another; and a document sensor 45 that determines whether there is a document.

The components provided on the upstream side of the reading glass 23 are: a first conveying unit 46 that conveys documents to a first reading device; and a first document edge sensor 47 that detects the top end and the bottom end of each document. The components provided on the downstream side of the reading glass 23 are a second conveying unit 48 and a second document edge sensor 49 that detects the top end and the bottom end of each document. The component provided on the downstream side of the second conveying unit 48 is a third conveying unit 51 that discharges documents onto a document discharge tray 50. The second image reading unit 41 is located between the second conveying unit 48 and the third conveying unit 51.

The first image reading unit 21 is to read one side of each document, having a first illuminating unit 21c that illuminates documents, an optical system 21f that is formed with mirrors 21d and an image focusing lens 21e, and a linear CCD (Charge Coupled Device) 21g that has photoelectric conversion elements arranged in a line. The first image reading unit 21 is integrally formed with the first reading device. At the time of image reading, the light emitted from the first illuminating unit 21c and reflected by a document face is focused onto the line CCD 21g by the optical system 21f to photoelectrically convert the information of the image on one side of the document.

The second image reading unit 41 is to read the other side of each document, and includes a second illuminating unit 41c, an optical system 41f formed with mirrors 41d and an image focusing lens 41e, and a linear CCD 41g. The second image reading unit 41 is fixed at a predetermined location in the automatic document feeder (ADF) 40. In the second image reading unit 41, the light emitted from the second illuminating unit 41c and reflected by a document face is focused onto the CCD 41g by the optical system 41f, and the information of the image of the other side of the document is photoelectrically converted.

Figure 4:
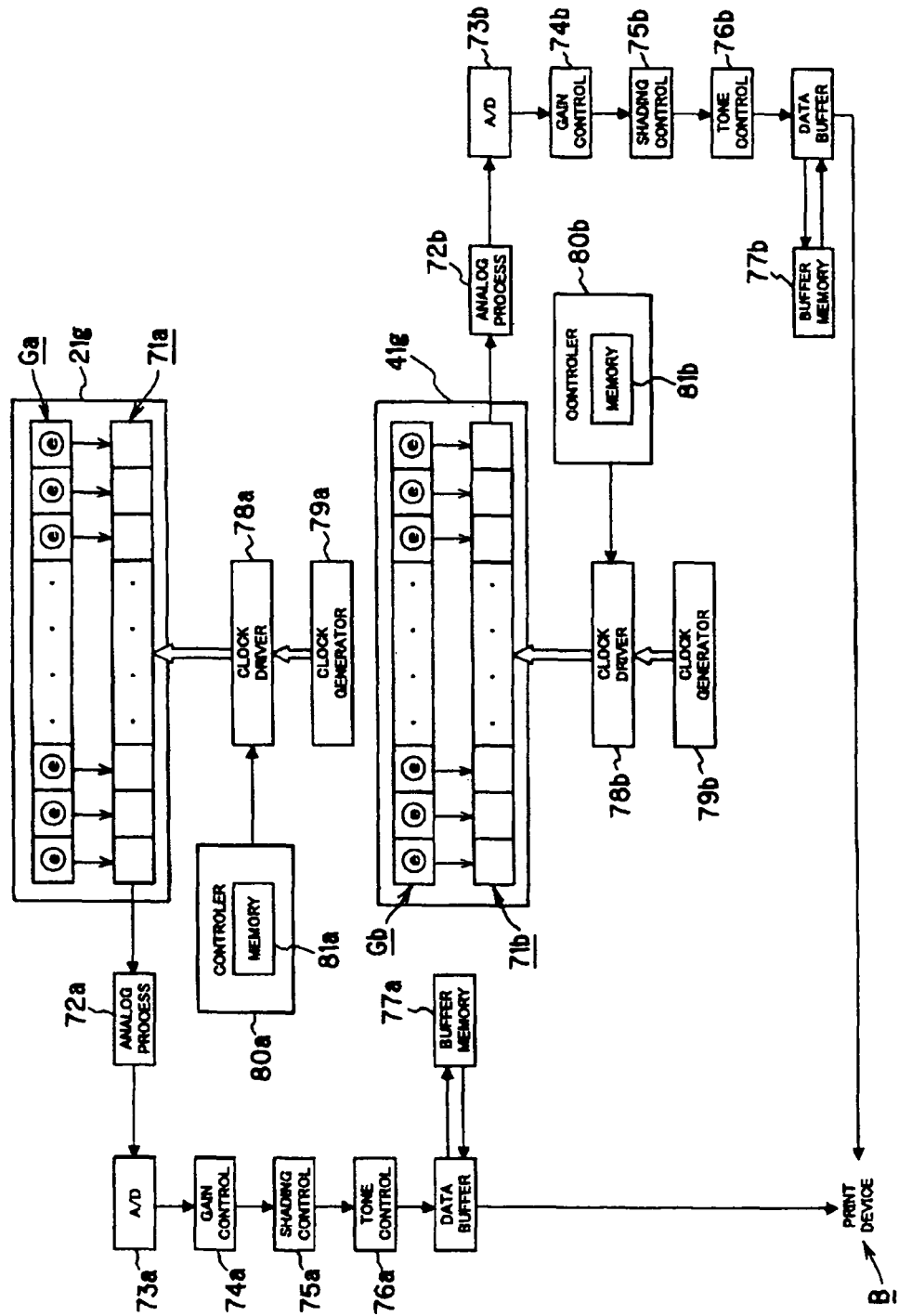
FIG. 4 is a block diagram of the image processor of an image reading unit in accordance with a first embodiment of the present invention.

Referring now to FIG. 4, a read image data processing is described. FIG. 4 is a block diagram illustrating the structure of the image processor of an image reading unit in accordance with the first embodiment of the present invention. The image reading unit in accordance with this embodiment applies a different transfer pulse to each of the linear CCDs 21g and 41g, so as to transfer the charges of CCD analog registers 71a and 71b.

As already known, each of the linear CCDs 21g and 41g has a number of photoelectric conversion elements aligned in the main scanning direction. The data of one line in the main scanning direction of a document is read in, and is photoelectrically converted to be output as an image signal. When the linear CCD 21g receives the light reflected by a surface of a document, the charges representing the information of the image on the surface of the document are accumulated in each photoelectric conversion element Ga. The accumulated charges are collectively sent to the CCD analog register 71a, and are then transferred to an analog signal processor 72a one by one by virtue of predetermined transfer pulses while moving from one register cell to another neighboring register cell in the CCD analog register 71a.

In FIG. 4, reference numeral 79a indicates a clock generator that generates clock pulses. Reference numeral 78a indicates a clock driver that controls the clock pulses generated from the clock generator 79a in accordance with control signals from a controller 80a, so as to generate the transfer pulses. Reference numeral 81a indicates a memory that is installed in the controller 80a and stores parameters for determining the transfer pulses.

The analog signal processor 72a converts the transferred charges into an analog image signal by replacing the charges with voltage values. After various corrections such as a sensitivity correction are performed, an A-D converter 73a converts the analog image signal into a digital image signal. Further corrections are performed at a gain controller 74a, a shading corrector 75a, a tone controller 76a, and the likes. The image data is then temporarily stored as the digital data of one line in a buffer memory 77a. The image data is then read out to the image recording apparatus B.

When the transfer of the charges of one line to the CCD analog register 71a is completed in the above described operation, the image data of the next line is read in. However, through the above procedure, the document has moved in the sub-scanning direction with respect to the image reading unit, and the image of the second line is an image at a different location from the image of the first line in terms of the sub-scanning direction.

Meanwhile, when the linear CCD 41g receives the light reflected by a back surface of a document, the charges representing the information of the image of the back surface of the document are accumulated in each photoelectric conversion element Gb. The accumulated charges are collectively sent to the CCD analog register 71b, and are then transferred to an analog signal processor 72b one by one by virtue of the predetermined transfer pulses while moving from one register cell to another neighboring register cell in the CCD analog register 71b. In FIG. 4, reference numeral 79b indicates a clock generator that generates clock pulses. Reference numeral 78b indicates a clock driver that controls the clock pulses generated from the clock generator 79b in accordance with control signals from a controller 80b, so as to generate the transfer pulses. Reference numeral 81b indicates a memory that is installed in the controller 80b and stores parameters for determining the transfer pulses.

The analog signal processor 72b converts the transferred charges into an analog image signal by replacing the charges with voltage values. After various corrections such as a sensitivity correction are performed, an A-D converter 73b converts the analog image signal into a digital image signal. Further corrections are performed at a gain controller 74b, a shading corrector 75b, a tone controller 76b, and the likes. The image data is then temporarily stored as the digital data of one line in a buffer memory 77b. The image data is then read out to the image recording apparatus B.

Referring back to FIG. 2, reading operations in the respective reading modes are described.

In the two-side ADF mode, the first image reading unit 21 stops and remains at a location below the reading glass 23. In response to a reading start instruction, the pick-up roller 43 rolls out documents placed on the document tray 12 one by one, starting from the top, toward the left in the drawing. The rolled-out documents are reversed 180 degrees at the U-turn path 40a, and are conveyed along the reading glass 23 by the first conveying unit 46. Thus, the information of the image of a surface of each document is read by the first image reading unit 21.

The documents from which the upper-side images have been read are then by a conveyed second conveying unit 48 to the right in the drawing, and the information of the image of the other surface of each document is read by the second image reading unit 41. The documents from which the back-side images have also been read are further conveyed toward the right in the drawing by the third conveying unit 51, and are then discharged onto the document discharge tray 50.

In the one-side ADF mode, the first image reading unit 21 stops and remains at the predetermined location below the reading glass 23, as in the two-side ADF mode. After the information of the image of a surface of each document is read by the first image reading unit 21 in the same manner as in the two-side ADF mode, the documents are conveyed toward the right in the drawing by the third conveying unit 51, and are then discharged onto the document discharge tray 50, without a reading operation by the second image reading unit 41.

In the BOOK mode, a document pressing plate 52 integrally formed with the ADF 40 is opened, and the images of the documents placed on the platen glass 22 are read, with the image sides facing downward. In response to a reading start instruction, the first image reading unit 21 is moved to a spot below the platen glass 22 by a driving unit, and reads the image information while moving to the right in the drawing. Thus, the image information is read in.

(3) Image Expansion and Contraction Correcting Method

In the image reading apparatus with the above described structure, while the first image reading unit 21 is reading images, the document conveying speed is controlled mostly by the first conveying unit 46 and the second conveying unit 48. While the second image reading unit 41 is reading images, the document conveying speed is controlled mostly by the second conveying unit 48 and the third conveying unit 51. Therefore, if there is a difference in conveying speed between the pair of conveying rollers constituting each conveying unit, a difference is caused in the expanding and contracting rate in the sub-scanning direction of the read image data, between the upper surface and the back surface of each document.

To counter this problem, in this embodiment, the amount of read data of one line in the main scanning direction is varied during a reading operation, so as to correct image expansion and contraction.

Figure 5:
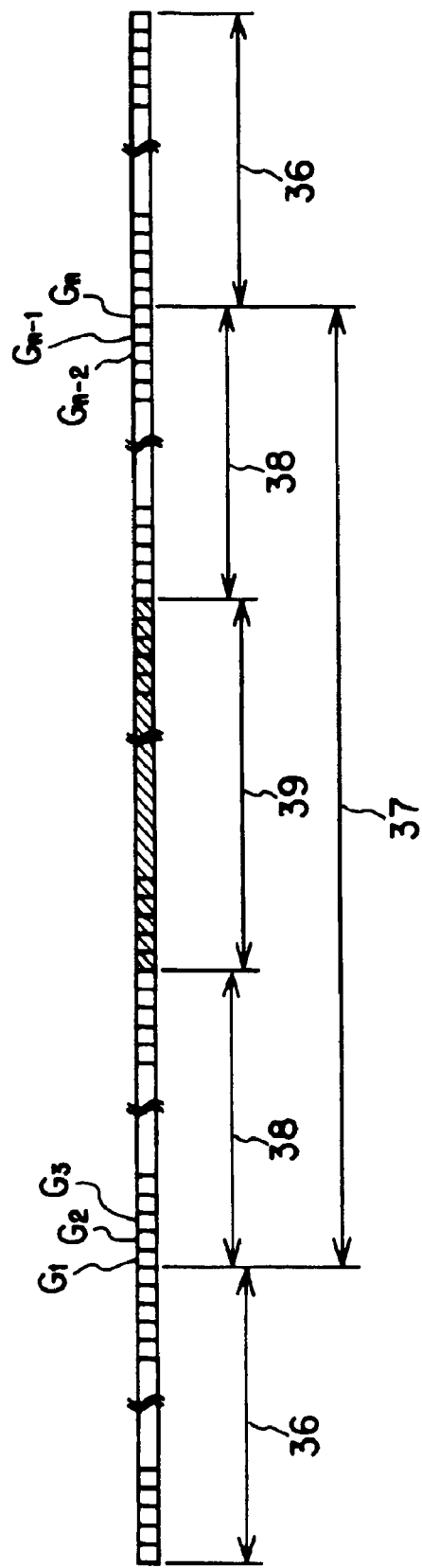
FIG. 5 is a schematic view of a CCD.

FIG. 5 is a schematic view of a CCD. A linear CCD has a number of photoelectric conversion elements G aligned in the main scanning direction. The photoelectric conversion elements G constitute pixels G1, G2, G3, . . . Gn, respectively, which read images.

In a conventional image reading apparatus, not all the pixels of a CCD are used for reading images, and there are non-reading pixels 36 that do not read image data at the top and the bottom of the entire pixels of the CCD. Also, not all the reading pixels 37 correspond to document image data, and there are invalid pixels 38 that do not correspond to document image data at the top and the bottom of the entire reading pixels 37.

The image data actually read in by the CCD turn into the reading pixels 37. Before the image data is transferred to a printer or after the image data is received by a printer (at the time of scanning or before a scan image is formed), print image data (or scan image data) is created by masking the peripheral unnecessary portions. The portions that are cut off through the masking turn into the invalid pixels 38 in the main scanning direction. Thus, the non-reading pixels 36 and the invalid pixels 38 are not used as part of a recording image (or a scan image). Accordingly, if the number of pixels to be read is increased or reduced within the range of the non-reading pixels 36 and the invalid pixels 38, the read image in the main scanning direction is not affected.

Figure 6:
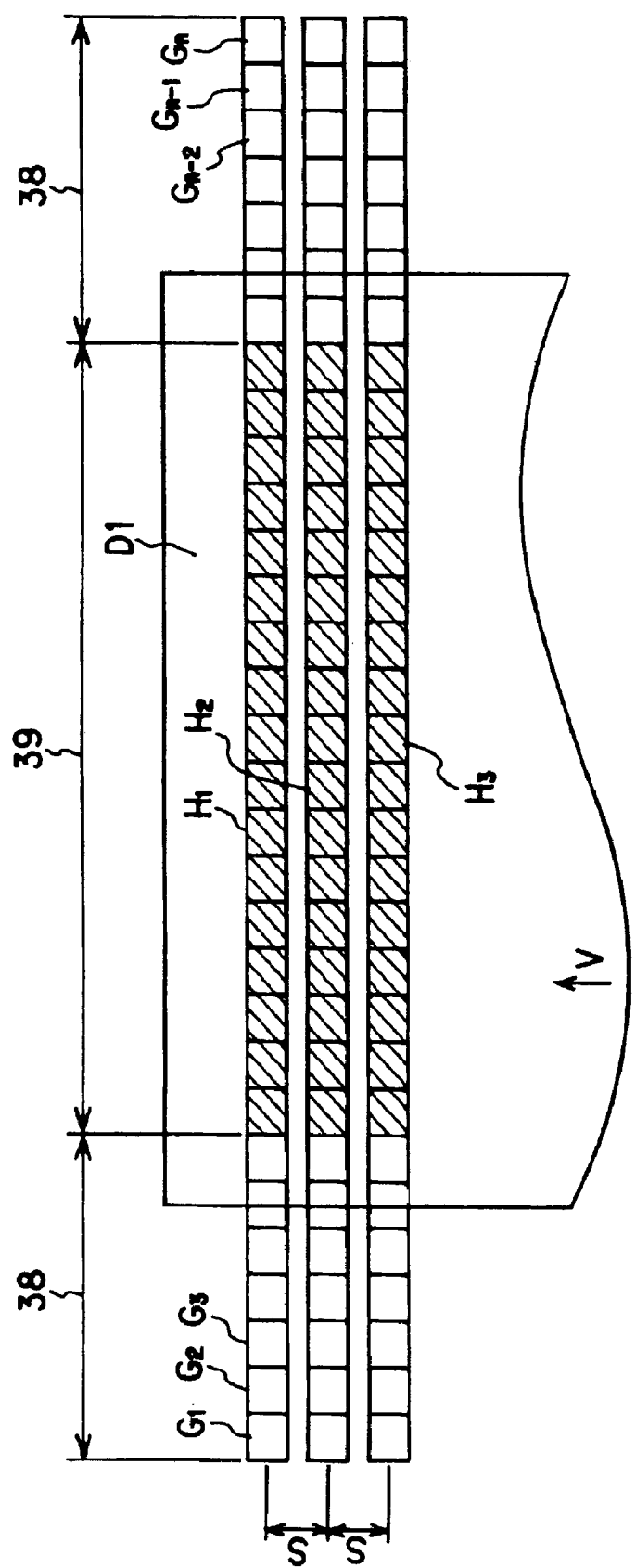
FIG. 6 illustrates a read region in a case where the image of a moving document is read by a linear CCD.

FIG. 6 illustrates a read region in a case where the image of a moving document is read by a linear CCD. FIGS. 7A through 9D illustrate the relations between the reading position of each one line in the main scanning direction at the time of image reading and the recording position when an image is recorded on a sheet based on read data.

To read a document image, a linear CCD photoelectrically converts light reflected from the document, and transfers accumulated charges to a CCD analog register at once. Accordingly, if the document is moving at a conveying speed of V, an image in a region having a width in the sub-scanning direction is photoelectrically converted. In the following description, each region to be read by one scanning operation is defined as a reading line. Each interval between predetermined positions (in FIGS. 9A through 9D, the centers of the widths in the sub-scanning direction of the reading lines H) in the sub-scanning direction of the reading lines H is denoted by S (the sub-scanning interval). Each reading line H has a uniform width as described above. In FIGS. 7A through 9D, however, each reading line is represented by a straight line, for ease of explanation.

Figures 7A, 7B:
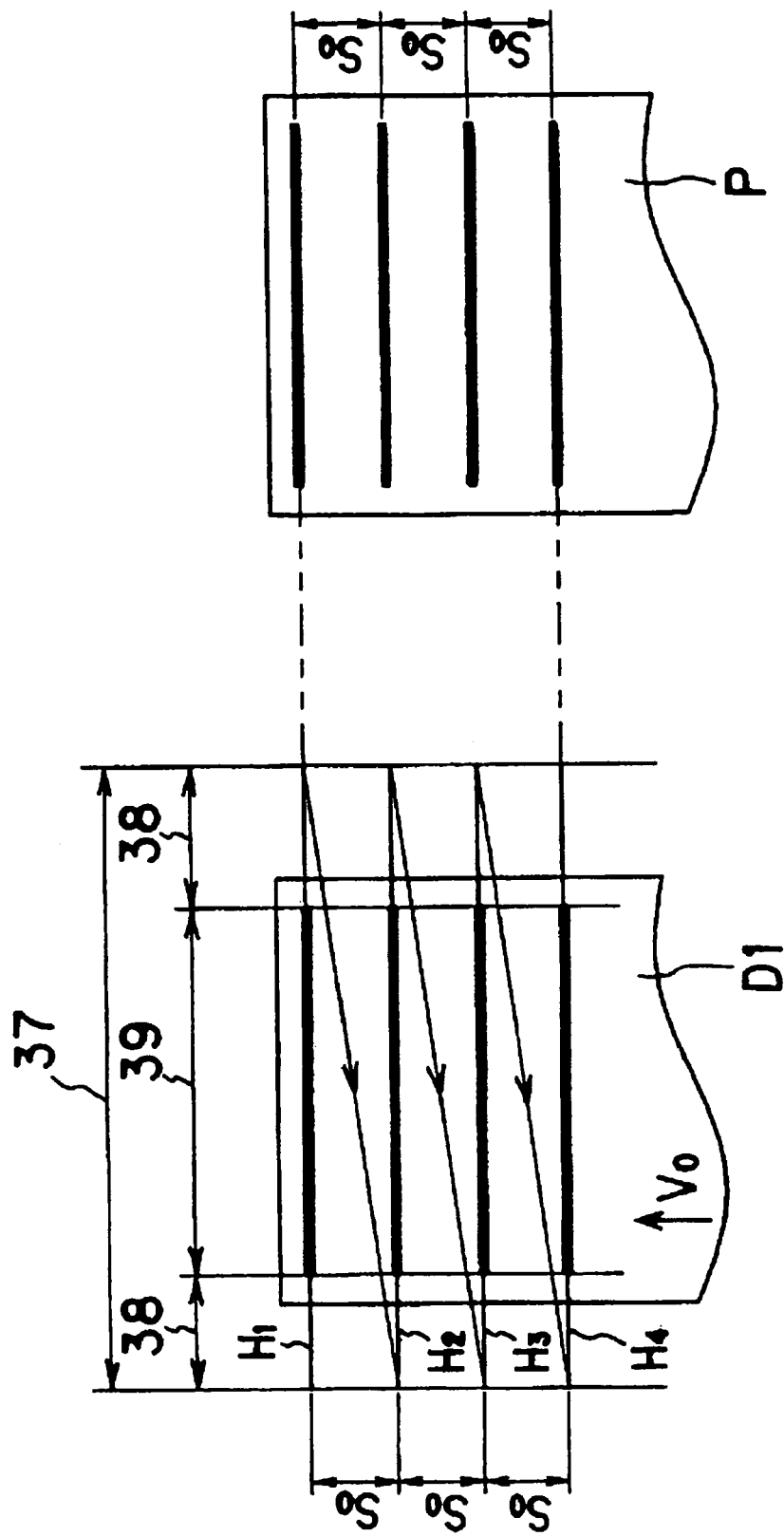
FIGS. 7A and 7B illustrate the ideal relationship between the reading position for each one main-scanning line on a document and the recording position for recording an image on a sheet based on the read data.

In the case of a digital copying machine, the image data of each one main-scanning line transferred from the image reading apparatus A is read at predetermined line intervals $S_0$, as shown in FIG. 7A, and the image recording apparatus B then performs image printing. Accordingly, the image data of the reading lines are printed at the reading line intervals $S_0$, as shown in FIG. 7B.

The reading line intervals in the sub-scanning direction in the image reading apparatus A are determined by the time required for transferring the image data of one main-scanning line to the analog signal processor 72 and the document conveying speed in the reading position. The time required for transferring the image data of one main-scanning line to the analog signal processor 72 is determined by the number of transfer pulses and the transfer pulse frequency.

Here, the transfer pulses are used for transferring the charges accumulated in the reading pixels 37 (including the invalid pixels 38) as the read image data of one line, and the number of transfer pulses is equivalent to the number of reading pixels 37. Accordingly, the reading line intervals in the sub-scanning direction in the image reading apparatus A are determined by the number of transfer pulses, the transfer pulse frequency, and the document conveying speed in the reading position.

With respect to the line intervals $S_0$ predetermined for the image recording apparatus B, the transfer pulse number $N_0$ required for transferring the read image data of one line, the transfer pulse frequency $\upsilon_0$, and the document conveying speed $V_0$ are so set as to satisfy the following equation:

$$S_0 = V_0 \cdot N_0 / \upsilon_0 \qquad (1)$$

The document conveying unit of the image reading apparatus A should preferably have rollers of such shapes and such a rotational speed as to achieve the conveying speed $V_0$ that satisfies the above equation (1). In the following description, the conveying speed $V_0$ that satisfies the above equation (1) is defined as the ideal conveying speed.

If the document conveying speed differs from the ideal conveying speed $V_0$ in the image reading apparatus A of the above described structure, the reading line intervals in the sub-scanning direction differ from the predetermined line intervals $S_0$. As a result, the recorded image becomes smaller or larger than the original image of the document.

In the following, an image contraction correcting operation and an image expansion correcting operation will be described.

(Image Contraction Correction)

If the document conveying speed during image reading is $V_1$, which is higher than the ideal document conveying speed $V_0$, each reading line interval S in the sub-scanning direction is expressed as:

$$S = V_1 \cdot N_0 / \upsilon_0 \qquad (2)$$

where each reading line interval S is wider than the ideal reading line interval $S_0$, as shown in FIG. 8A.

Meanwhile, the image recording apparatus B performs printing based on the ideal reading line intervals $S_0$. As a result, the read image contracts in the sub-scanning direction when printed, as shown in FIG. 8B.

In this case, the number of transfer pulses required for one main-scanning line should be made smaller than the ideal transfer pulse number $N_0$, so as to correct the image contraction in the sub-scanning direction. More specifically, as the number of transfer pulses for one line is made $N_1$, which is smaller than the ideal transfer pulse number $N_0$, the time required for transferring the image data of the one line becomes $N_1/\upsilon_0$, which is shorter than the ideal transfer time by $(N_0-N_1)/\upsilon_0$. Thus, the reading of the next line can be started sooner.

With the number of transfer pulses being $N_1$, each reading line interval $S_1$ in the sub-scanning direction is expressed as:

$$S_1 = V_1 \cdot N_1 / \upsilon_0 \qquad (3)$$

In accordance with the equations (1) and (2), the transfer pulse number $N_1$ satisfying $S_1 = S_0$ is expressed as:

$$N_1 = N_0 \cdot V_0 / V_1 \qquad (4)$$

With the transfer pulse number $N_1$ for one line being $N_0 \cdot V_0/V_1$, each reading line interval in the sub-scanning direction becomes $S_0$, as shown in FIG. 8C. As a result, the reading intervals in the sub-scanning direction become narrower, with respect to each document being conveyed at a higher speed than the ideal document conveying speed.

Meanwhile, the image recording apparatus B performs printing based on the predetermined reading line intervals $S_0$. Accordingly, in the printed image data of one page, the image contraction has been corrected, as shown in FIG. 8D.

In a case where the read image of the front surface of a document contracts, the number of transfer pulses for one main-scanning line in the transfer pulses to be applied to the first image reading unit 21 is set at $N_1$ expressed as in the equation (4), so as to correct the image contraction. Here, the controller 80a determines the number of transfer pulses for each one line, based on the transfer pulse number stored in the memory 81a. The clock driver 78a then generates and applies transfer pulses to the linear CCD 21g. Therefore, the number of one-line transfer pulses to be applied to the linear CCD 21g is changed by rewriting the transfer pulse number $N_0$ stored beforehand in the memory 81a to $N_1$.

In a case where the read image of the back surface of a document contracts, the number of transfer pulses for one main-scanning line in the transfer pulses to be applied to the second image reading unit 41 is set at $N_1$ expressed as in the equation (4), so as to correct the image contraction. Here, the controller 80b determines the number of transfer pulses for each one line, based on the transfer pulse number stored in the memory 81b. The clock driver 78b then generates and applies transfer pulses to the linear CCD 41g. Therefore, the number of one-line transfer pulses to be applied to the linear CCD 41g is changed by rewriting the transfer pulse number $N_0$ stored beforehand in the memory 81b to $N_1$.

Since the number of transfer pulses is made smaller than the previous number of transfer pulses during the above described correcting operation, there are read image data not to be transmitted to the image recording apparatus B. However, the reading pixels not to be transmitted to the image recording apparatus B do not affect the valid pixels 39 representing the document image data, as long as they are contained in the invalid pixels 38.

In a case where the pair of conveyance rollers constituting the third conveying unit 51 have large external sizes within the size tolerance, the conveying speed of the third conveying unit 51 is high, and the image read by the second image reading unit 41 contracts in the sub-scanning direction, the image contraction in the sub-scanning direction can be corrected by making the number of one-line transfer pulses smaller than the one-line transfer pulse number according to the ideal conveying speed in the above described manner.

(Image Expansion Correction)

If the document conveying speed during image reading is $V_2$, which is lower than the ideal document conveying speed $V_0$, each interval $S_2$ between the reading lines H in the sub-scanning direction is expressed as:

$$S_2 = V_2 \cdot N_0 / v_0 \quad (5)$$

where each interval $S_2$ between the reading lines H is narrower than the ideal interval $S_0$ between the reading lines H, as shown in FIG. 9A.

Meanwhile, the image recording apparatus B performs printing based on the ideal reading line intervals $S_0$. As a result, the read image expands in the sub-scanning direction when printed, as shown in FIG. 9B.

In this case, the number of transfer pulses required for one main-scanning line should be made larger than the ideal transfer pulse number $N_0$, so as to correct the image expansion in the sub-scanning direction. More specifically, as the number of transfer pulses for one line is made $N_2$, which is larger than the ideal transfer pulse number $N_0$, the time required for transferring the image data of one line becomes $N_2/v_0$, which is longer than the ideal transfer time by $(N_2 - N_0)/v_0$. Thus, the start of the reading of the next line can be delayed.

Prolonging the time required for transferring the image data of one line by $(N_2 - N_0)/v_0$ is equivalent to shortening the time by $(N_0 - N_2)/v_0$. Accordingly, the same relationship as that in the above described case of correcting image contraction is established.

The transfer pulse number $N_2$ for one line is expressed as:

$$N_2 = N_0 \cdot V_0 / V_2 \quad (6)$$

With the transfer pulse number $N_2$ for one line being $N_0 \cdot V_0 / V_2$, each reading line interval in the sub-scanning direction becomes $S_0$, as shown in FIG. 9C. As a result, the reading intervals in the sub-scanning direction become wider, with respect to each document being conveyed at a lower speed than the ideal document conveying speed. Meanwhile, the image recording apparatus B performs printing based on the predetermined reading line intervals $S_0$. Accordingly, in the printed image data of one page, the image expansion has been corrected, as shown in FIG. 9D.

In a case where the read image of the front surface of a document expands, the number of transfer pulses for one main-scanning line in the transfer pulses to be applied to the first image reading unit 21 is set at $N_2$ expressed as in the equation (6), so as to correct the image expansion. Here, the controller 80a determines the number of transfer pulses for each one line, based on the transfer pulse number stored in the memory 81a. The clock driver 78a then generates and applies transfer pulses to the linear CCD 21g. Therefore, the number of one-line transfer pulses to be applied to the linear CCD 21g is changed by rewriting the transfer pulse number $N_0$ stored beforehand in the memory 81a to $N_2$.

In a case where the read image of the back surface of a document expands, the number of transfer pulses for one main-scanning line in the transfer pulses to be applied to the second image reading unit 41 is set at $N_2$ expressed as in the equation (6), so as to correct the image expansion. Here, the controller 80b determines the number of transfer pulses for each one line, based on the transfer pulse number stored in the memory 81b. The clock driver 78b then generates and applies transfer pulses to the linear CCD 41g. Therefore, the number of one-line transfer pulses to be applied to the linear CCD 41g is changed by rewriting the transfer pulse number $N_0$ stored beforehand in the memory 81b to $N_2$.

Since the number of transfer pulses is made larger than the previous number of transfer pulses during the above described correcting operation, image data other than the reading pixels 37 are transmitted to the image recording apparatus B. However, the image data equivalent to the increase in transfer pulse number are represented by the non-reading pixels 36, and the image data transmitted to the image recording apparatus B do not affect the valid pixels 39 representing the document image data.

In a case where the pair of conveyance rollers constituting the third conveying unit 51 have small external sizes within the size tolerance, the conveying speed of the third conveying unit 51 is low, and the image read by the second image reading unit 41 expands in the sub-scanning direction, the image expansion in the sub-scanning direction can be corrected by making the number of one-line transfer pulses larger than the one-line transfer pulse number according to the ideal conveying speed in the above described manner.

Figure 10:
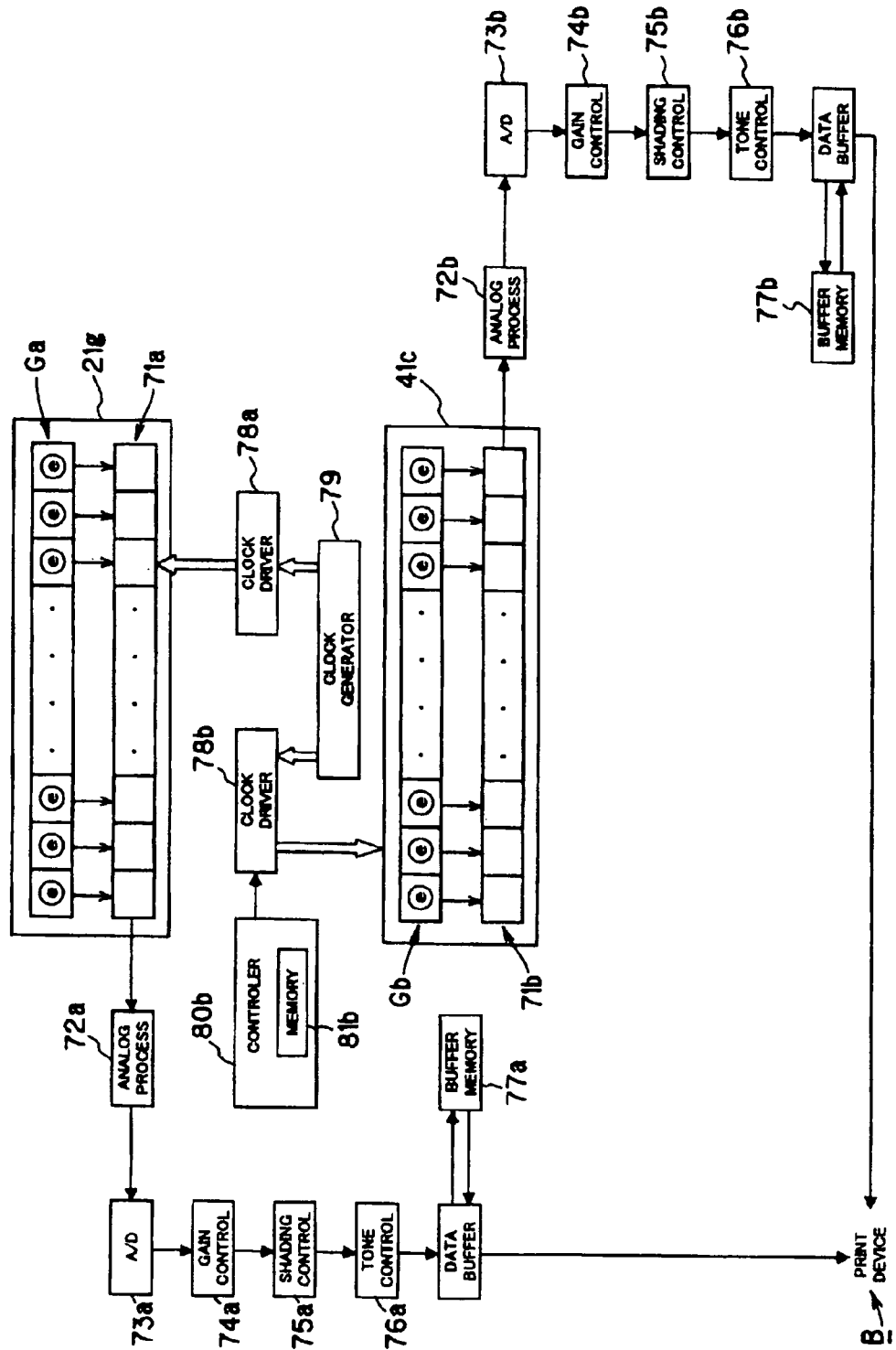
FIG. 10 is a block diagram of the image processor of an image reading unit in accordance with the first embodiment of the present invention.

In a case where expansion or contraction of an image read by the first image reading unit 21 is to be corrected by adjusting the rotational speed of the driving motor as described with the prior art, the correction through adjustment of the image data length should be performed only on the image read by the second image reading unit 41. In such a case, the image processor has a controller 80b only for the clock driver 78b, as shown in FIG. 10.

Next, image expansion and contraction correcting operations in a case where the conveying speeds of the conveying units (conveyance rollers) are purposely varied are described.

As the conveying speeds of the conveying units are purposely varied, the logical values of the document conveying speed for reading by the first image reading unit and the document conveying speed for reading by the second image reading unit are known in advance. Therefore, based on the known logical values of the document conveying speeds, the numbers of transfer pulses according to the conveying speeds should be preset for the image reading units.

For example, the speed of the driving motor is adjusted so that the document conveying speed in the reading position of the first image reading unit 21 becomes equal to $V_0$, which satisfies the ideal reading line interval $S_0=V_0 \cdot N_0/v_0$. Meanwhile, the document conveying speed in the reading position of the second image reading unit 41 is set at $V_3$. This case is described below in detail.

Each reading line interval $S_0$ of the first image reading unit 21 is expressed as:

$$S_0=V_0 \cdot N_0/v_0 \qquad (7)$$

With the transfer pulse number of the second image reading unit 21 being $N_3$, each reading line interval $S_3$ of the second image reading unit 41 is expressed as:

$$S_3=V_3 \cdot N_3/v_0 \qquad (8)$$

In accordance with the equations (6) and (7), the condition for $S_0=S_3$ is as follows:

$$N_3=N_0 \cdot V_0/V_3 \qquad (9)$$

As the transfer pulse number $N_3$ of the second image reading unit 21 is a value satisfying the equation (9), the reading line intervals of the second image reading unit 41 become equal to the reading line intervals of the first image reading unit 21, and expansion and contraction of the image are corrected. If the ratio of the document conveying speed $V_0$ of the first image reading unit 21 in the reading position to the document conveying speed $V_3$ of the second image reading unit 41 in the reading position is not an integer, the transfer pulse number $n_3$ is made an integer approximating $N_3$ calculated by the equation (9), so that image expansion and contraction can be made remarkably smaller.

Next, an image expansion and contraction correcting method is described. This method is utilized in a case where image expansion and contraction vary among images due to variations in conveyance roller size within the size tolerance.

For example, the apparatus is designed so that the document conveying speed in the reading position of the first image reading unit 21 and the document conveying speed in the reading position of the second image reading unit 41 become $V_0$, which satisfies the condition for the ideal reading line interval $S_0=V_0 N_0/v_0$. Here, if there is a difference in roller external size within the size tolerance between the conveying units each formed with a pair of rollers, read image expansion and contraction differs between the front surface and the back surface of the document.

Since the roller external size of the pair of rollers constituting each conveying unit differs from that of the rollers of each other image reading apparatus, the difference in read image expansion and contraction between the front surface and the back surface of each document also differs from those of each other image reading apparatus. As described above, in a case where there are differences in image expansion and contraction among apparatuses, and the difference in image expansion and contraction between the front surface and the back surface is to be corrected, a document having a known image length in the sub-scanning direction is read during the process of assembling the apparatus, and an appropriate transfer pulse number is calculated and set through comparison between the known image length and the length of the actually read image.

More specifically, a document having an image with a known length $L_F$ on the front surface and an image with a known length $L_B$ on the back surface is read by the image reading apparatus A. Here, the image on the front surface of the document is read by the first image reading unit 21, and the image on the back surface of the document is read by the second image reading unit 41. In a case where the length of the image read by the first image reading unit 21 is $L_{FP}$, the image expansion and contraction are corrected in the following manner.

Where a document being conveyed at the conveying speed $V_1$ is read with the number $N_0$ of transfer pulses and at the transfer pulse frequency $v_0$, the reading line interval $S_1$ is expressed as:

$$S_1=V_1 \cdot N_0/v_0 \qquad (10)$$

Where the image is read at the reading line intervals $S_1$, the number M of lines constituting the image with the predetermined length $L_F$ is expressed as:

$$M=L_F/S_1 \qquad (11)$$

When the image is recorded, printing is performed based on the ideal reading line intervals $S_0$. Accordingly, the length $L_{FP}$ of the recorded image is expressed as:

$$L_{FP}=S_0/M \qquad (12)$$

In accordance with the equations (1), (10), (11), and (12), the following equation is established:

$$L_{FP}/L_F=V_0/V_1 \qquad (13)$$

As can be seen from this equation, the ratio of the length of the original image to the length of the recorded image is equal to the inverse of the ratio between the document conveying speeds.

In accordance with the equations (4) and (13), the number $N_4$ of transfer pulses for correcting image expansion and contraction under the above described conditions is expressed as:

$$N_4=N_0 \cdot V_0/V_1=N_0 \cdot L_{FP}/L_F \qquad (14)$$

Accordingly, the image expansion and contraction in the sub-scanning direction of the first image reading unit 21 of each image reading apparatus A can be corrected by changing the number of transfer pulses to a value satisfying the above equation (14).

If $N_4$ expressed as in the equation (14) is not an integer, the transfer pulse number $n_4$ for correcting expansion and contraction of the image on the front surface of the document is made an integer approximating $N_4$ satisfying the equation (14), so that image expansion and contraction can be made remarkably smaller.

If the length of the image read by the second image reading unit 41 is $L_{BP}$, the number $N_5$ of transfer pulses for correcting expansion and contraction of the image on the back surface of the document should be changed to a value satisfying the following equation in accordance with the same relational expressions as above:

$$N_5=N_0 \cdot L_{BP}/L_B \qquad (15)$$

Thus, image expansion and contraction in the sub-scanning direction of the second image reading unit 41 of each image reading apparatus A can be corrected.

If $N_5$ expressed as in the equation (15) is not an integer, the transfer pulse number $n_5$ for correcting expansion and contraction of the image on the back surface of the document is made an integer approximating $N_5$ satisfying the equation (15), so that image expansion and contraction can be made remarkably smaller.

By this method, it is not necessary to measure the conveying speeds of the conveying units (pairs of conveyance rollers), and the number of transfer pulses for correcting image expansion and contraction can be easily set to eliminate the image expansion and contraction. Even if image expansion and contraction become larger due to wear and degradation with time in the market, the transfer pulse number can be recalculated and reset in the same manner as above. Thus, image expansion and contraction can be properly corrected by a simple method.

Second Embodiment

FIGS. 11A through 11D and FIGS. 12A through 12D illustrate a second embodiment of the present invention. In the first embodiment, to correct image expansion and contraction, the number of transfer pulses is changed to adjust the image reading speed. In this embodiment, on the other hand, the frequency of transfer pulses is changed (modulated) to adjust the image reading speed.

It should be noted that the other aspects of the structure and functions are the same as those of the first embodiment, and therefore, explanation of them is omitted herein.

An image forming apparatus in accordance with this embodiment has substantially the same structure as that in the first embodiment. This embodiment differs from the first embodiment in that the transfer pulse number of each CCD as an image reading unit is fixed, but the frequency of the transfer pulses is modulated so as to correct image expansion and contraction. By the image expansion and contraction correcting method in accordance with the first embodiment, the number of transfer pulses for transferring the read image data of each one main-scanning line read by a CCD to the analog signal processor 72 is varied between the first image reading unit 21 and the second image reading unit 41, so as to correct the difference in image expansion and contraction between the front surface and the back surface of each document.

By the image expansion and contraction correcting method in accordance with this embodiment, on the other hand, the frequency of the transfer pulses for transferring charges from the CCD analog register 71 (this frequency will be hereinafter referred to as the "transfer pulse frequency") is varied between the first image reading unit 21 and the second image reading unit 41 at the time of image data reading, so as to correct the difference in image expansion and contraction between the front surface and the back surface of each document.

The time T required for transferring the image data of one line consisting of $N_0$ of reading pixels to the analog signal processor 72 at a transfer pulse frequency $\upsilon$ is expressed as:

$$T = N_0/\upsilon \qquad (16)$$

Accordingly, with a higher transfer pulse frequency $\upsilon$, the time required for transferring the image data of one line to the analog signal processor 72 is shortened. With a lower transfer pulse frequency $\upsilon$, the time required for transferring the image data of one line to the analog signal processor 72 is extended.

In a case where an image contracts in the sub-scanning direction, the CCD driving frequency is made higher than the ideal driving frequency by the clock driver 78, so as to shorten the time required for transferring the image data of each one line. Thus, reading of the next line can be started sooner.

FIGS. 11A through 11D and FIGS. 12A through 12D illustrate the relationships between the reading position for each one main-scanning line at the time of image reading and the recording position for recording an image on a sheet based on the read data.

In a case where the actual document conveying speed $V_1$ is higher than the ideal document conveying speed $V_0$, the read image is printed as it contracts in the sub-scanning direction, as shown in FIGS. 8A and 8B illustrating the first embodiment.

With the transfer pulse frequency being $\upsilon_1$, the reading line interval $S_1$ in the sub-scanning direction is expressed as:

$$S_1 = V_1 \cdot N_0/\upsilon_1 \qquad (17)$$

In accordance with the equations (1) and (16), the frequency $\upsilon_1$ satisfying $S_1 = S_0$ is expressed as:

$$\upsilon_1 = \upsilon_0 \cdot V_1/V_0 \qquad (18)$$

With the CCD transfer pulse frequency $\upsilon_1$ being a value satisfying the equation (18), the reading line interval in the sub-scanning direction for a document being conveyed at the document conveying speed $V_1$ becomes $S_0$, as shown in FIG. 11C. Meanwhile, the image recording apparatus B performs printing based on the predetermined reading line intervals $S_0$. Accordingly, in the printed image data of one page, the image contraction has been corrected, as shown in FIG. 11D.

Here, the coefficient for modulating the transfer pulse frequency $\upsilon$ is stored in the memory 81. Based on the transfer pulse frequency modulation coefficient stored in the memory 81, the clock driver 78 modulates the transfer pulse frequency of the pulse generator 79a, and then applies the transfer pulse frequency to the linear CCD 21g. Accordingly, the transfer pulse frequency to be applied to the linear CCD 21g is changed by rewriting the transfer pulse frequency modulation coefficient corresponding to the transfer pulse frequency $\upsilon_0$ stored beforehand in the memory 81a, to the transfer pulse frequency modulation coefficient corresponding to the transfer pulse frequency $\upsilon_1$.

With the document conveying speed in the reading position of the first image reading unit 21 being $V_1$, the controller 80a determines the transfer pulse frequency for each one line, based on the transfer pulse frequency modulation coefficient stored in the memory 81a. The clock driver 78a then generates and applies transfer pulses to the linear CCD 21g. Accordingly, the transfer pulse frequency to be applied to the linear CCD 21g is changed by rewriting the transfer pulse frequency modulation coefficient corresponding to the transfer pulse frequency $\upsilon_0$ stored beforehand in the memory 81a, to the transfer pulse frequency modulation coefficient corresponding to the transfer pulse frequency $\upsilon_1$ satisfying the equation (18).

Likewise, in the second image reading unit 41, the controller 80b determines the transfer pulse frequency for each one line, based on the transfer pulse frequency modulation coefficient stored in the memory 81b. The clock driver 78b then generates and applies transfer pulses to the linear CCD 21g. Accordingly, with the document conveying speed in the reading position of the second image reading unit 41 being $V_2$, the transfer pulse frequency to be applied to the linear CCD 21g is changed by rewriting the transfer pulse frequency modulation coefficient corresponding to the transfer pulse frequency $\upsilon_0$ stored beforehand in the memory 81b, to the transfer pulse frequency modulation coefficient corresponding to the transfer pulse frequency obtained by substituting $V_1$ with $V_2$ in the equation (18).

In a case where the actual document conveying speed is lower than the ideal document conveying speed $V_0$, $V_1$ in the equations (17) and (18) is smaller than $V_0$ ($V_0 > V_1$). Other than that, the same equations as the equations (17) and (18) can be applied in this case. Accordingly, with the CCD transfer pulse frequency $\upsilon_1$ being a value satisfying the equation (18), the reading line interval in the sub-scanning direction for a document being conveyed at the document conveying speed $V_1$ becomes $S_0$, as shown in FIG. 12C. Meanwhile, the image recording apparatus B performs printing based on the predetermined reading line intervals $S_0$. Thus, in the printed image data of one page, the image expansion has been corrected, as shown in FIG. 12D.

As described above, in a case where the conveying speed of the third conveying unit 51 is high and the image read by the second image reading unit 41 contracts in the sub-scanning direction, the CCD transfer pulse frequency is made higher so as to correct the read image contraction in the sub-scanning direction.

In a case where an image expands in the sub-scanning direction, the CCD transfer pulse frequency is lowered by the clock driver 78, so as to extend the time required for transferring the image data of one line and to prolong the start of reading of the next line. For example, in a case where the conveying speed of the third conveying unit 51 is low and the image read by the second image reading unit 41 expands in the sub-scanning direction, the CCD transfer pulse frequency is made lower so as to correct the read image expansion in the sub-scanning direction.

(Image Expansion and Contraction Correcting Amount)

In a case where the conveying speeds of the conveying units (pairs of conveyance rollers) are purposely varied, the logical values of the document conveying speed for reading by the first image reading unit and the document conveying speed for reading by the second image reading unit are known in advance. Therefore, based on the known logical values of the document conveying speeds, the modulation coefficients (hereinafter referred to as the correction values) of the CCD transfer pulse frequencies for the image reading units should be calculated and set beforehand in the memory 81.

For example, the speed of the driving motor is adjusted so that the document conveying speed in the reading position of the first image reading unit 21 becomes equal to $V_0$, which satisfies the ideal reading line interval $S_0 = V_0 \cdot N_0 / \upsilon_0$. Meanwhile, the document conveying speed in the reading position of the second image reading unit 41 is set at $V_1$. This case is described below in detail.

Since $V_1$ and $V_0$ in the equation (18) are known in this case, such a correction value is set in the memory 81b that the transfer pulse frequency of the clock generator 79b is modulated to the transfer pulse frequency $\upsilon_1$, which satisfies the equation (18). Based on the correction value, the controller 80b controls the clock driver 78b so as to set the transfer pulse frequency to be applied to the linear CCD 41g at $\upsilon_1$.

Next, cases where image expansion and con-traction vary among devices due to variations in conveyance roller size within the size tolerance are described.

As described in the first embodiment, if there is a difference in external size of conveyance rollers within the size tolerance, the read image expansion and contraction are varied between the front surface and the back surface of the document, even though the apparatus is designed so that the document conveying speed in the reading position of the first image reading unit 21 and the document conveying speed in the reading position of the second image reading unit 41 are $V_0$, which satisfies the condition for the ideal reading line interval: $S_0 = V_0 \cdot N_0 / \upsilon_0$.

Since the roller external size of the pair of rollers constituting each conveying unit differs from that of the rollers of each other image reading apparatus, the difference in read image expansion and contraction between the front surface and the back surface of each document also differs from those of each other image reading apparatus. As described above, in a case where there are differences in image expansion and contraction among apparatuses, and the difference in image expansion and contraction between the front surface and the back surface is to be corrected, a document having a known image length in the sub-scanning direction is read during the process of assembling the apparatus, and an appropriate transfer pulse frequency is calculated and set through comparison between the known image length and the length of the actually read image.

More specifically, a document having an image with a known length $L_F$ on the front surface and an image with a known length $L_B$ on the back surface is read by the image reading apparatus A. Here, the image on the front surface of the document is read by the first image reading unit 21, and the image on the back surface of the document is read by the second image reading unit 41. In a case where the length of the image read by the first image reading unit 21 is $L_{FP}$, the image expansion and contraction are corrected in the following manner.

In the following, the document conveying speed in the reading position of the first image reading unit 21 is set as an unknown conveying speed $V_1$, and the document conveying speed in the reading position of the second image reading unit 41 is set as an unknown conveying speed $V_2$.

Where the front surface of a document being conveyed at the unknown conveying speed $V_1$ is read with the number $N_0$ of transfer pulses and at the transfer pulse frequency $\upsilon_0$, the reading line interval $S_1$ is expressed as:

$$S_1 = V_1 \cdot N_0 / \upsilon_0 \qquad (10)$$

which is the same as in the first embodiment.

Where the image is read at the reading line intervals $S_1$, the number M of lines constituting the image with the predetermined length $L_F$ is expressed as:

$$M = L_F / S_1 \qquad (11)$$

which is also the same as in the first embodiment.

When the image is recorded, printing is performed based on the ideal reading line intervals $S_0$. Accordingly, the length $L_{FP}$ of the recorded image is expressed as:

$$L_{FP} = S_0 / M \qquad (12)$$

which is also the same as in the first embodiment.

In accordance with the equations (1), (10), (11), and (12), the following relationship is established:

$$L_{FP} / L_F = V_0 / V_1 \qquad (13)$$

As can be seen from this equation, the ratio of the length of the original image to the length of the recorded image is equal to the inverse of the ratio between the document conveying speeds.

In accordance with the equations (18) and (13), the transfer pulse frequency $\upsilon_4$ for correcting image expansion and contraction under the above described conditions is expressed as:

$$\upsilon_4 = \upsilon_0 \cdot V_1 / V_0 = \upsilon_0 \cdot L_F / L_{FP} \qquad (19)$$

Accordingly, the image expansion and contraction in the sub-scanning direction of the first image reading unit 21 of each image reading apparatus A can be corrected by changing the transfer pulse frequency of the first image reading unit 21 to a value satisfying the above equation (19).

If the length of the image read by the second image reading unit 41 is $L_{BP}$, the transfer pulse frequency $\upsilon_5$ for correcting expansion and contraction of the image on the back surface of the document should be changed to a value satisfying the following equation in accordance with the same relational expressions as above:

$$\upsilon_5 = \upsilon_0 \cdot V_2 / V_0 = \upsilon_0 \cdot L_b / L_{BP} \qquad (20)$$

Thus, image expansion and contraction in the sub-scanning direction of the second image reading unit 41 of each image reading apparatus A can be corrected.

By this method, it is not necessary to measure the conveying speeds of the conveying units (pairs of conveyance rollers), and the transfer pulse frequency for correcting image expansion and contraction can be easily set to eliminate the image expansion and contraction. Even if image expansion and contraction become larger due to wear and degradation with time in the market, the transfer pulse frequency can be recalculated and reset in the same manner as above. Thus, image expansion and contraction can be properly corrected by a simple method.

Third Embodiment

FIGS. 13 through 15B illustrate a third embodiment of the present invention. In the first and second embodiments, image expansion and contraction are corrected by adjusting the image reading speeds of the image reading units. In the third embodiment, on the other hand, a document image is read while an image reading unit is moved with respect to the document being conveyed. In this manner, image expansion and contraction are corrected by adjusting the relative speed of the image reading unit with respect to the document. It should be noted that the other aspects of the structure and functions of this embodiment are the same as those of the first embodiment, and therefore, explanation of them is omitted herein.

In each image reading apparatus in accordance with the first and second embodiments, at the time of image reading in the ADF mode, image information is read by the first image reading unit and the second image reading unit that remain stationary in predetermined positions, while the document is being conveyed. In the image reading apparatus in accordance with this embodiment, at the time of image reading in the ADF mode, the image information of a document being conveyed by conveying units is read while the image reading units are moved at predetermined speeds.

More specifically, the image reading units are moved substantially in parallel with the conveying direction of a document being conveyed at a speed higher or lower than a predetermined conveying speed, so that the relative speed of the first image reading unit with respect to the document and the relative speed of the second image reading unit with respect to the document become equal to each other. By doing so, correction can be performed to reduce image expansion and contraction between the front surface and the back surface of the document.

Figure 13:
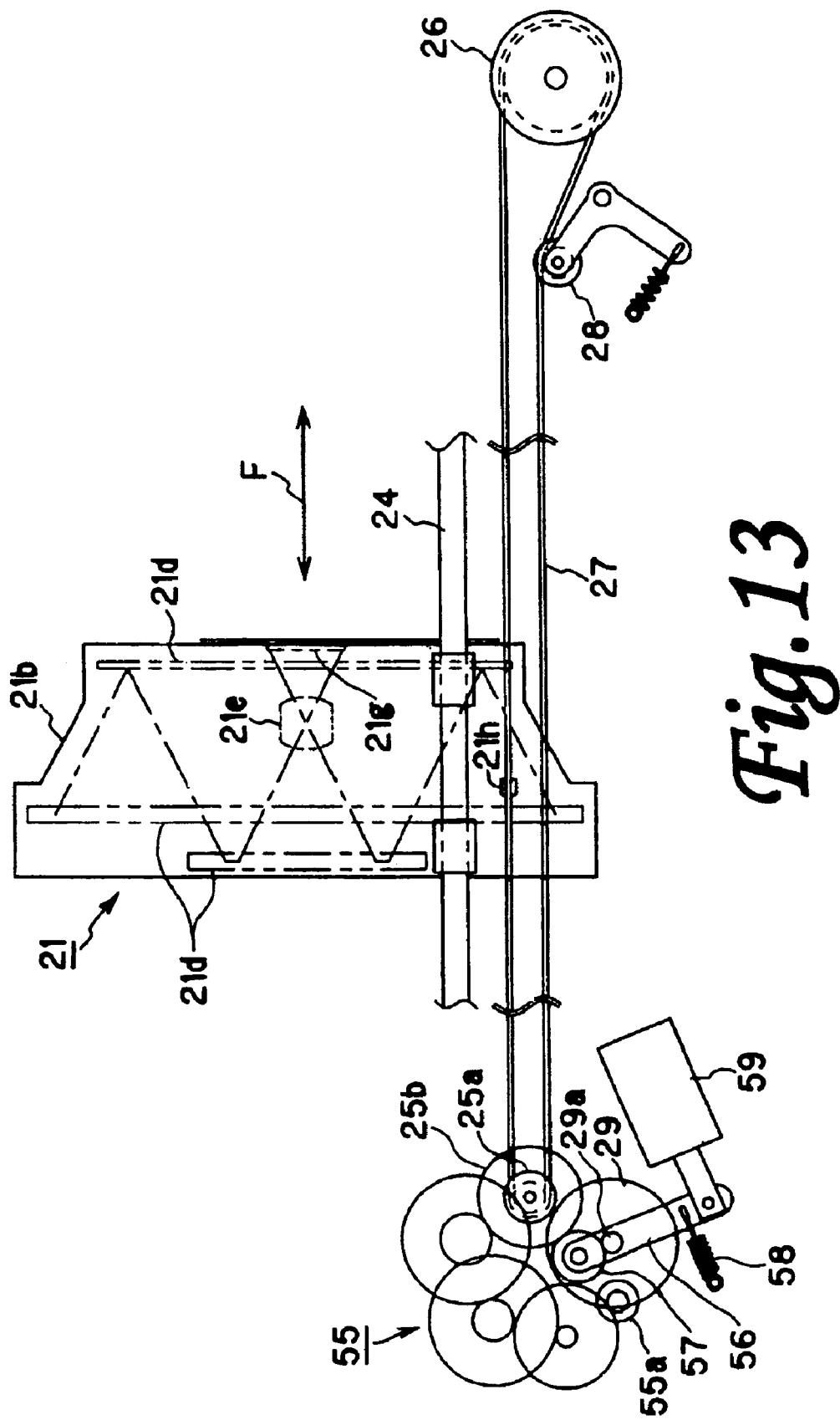
FIG. 13 illustrates the driving mechanism of an image reading unit in accordance with a third embodiment of the present invention.
Figure 14A:
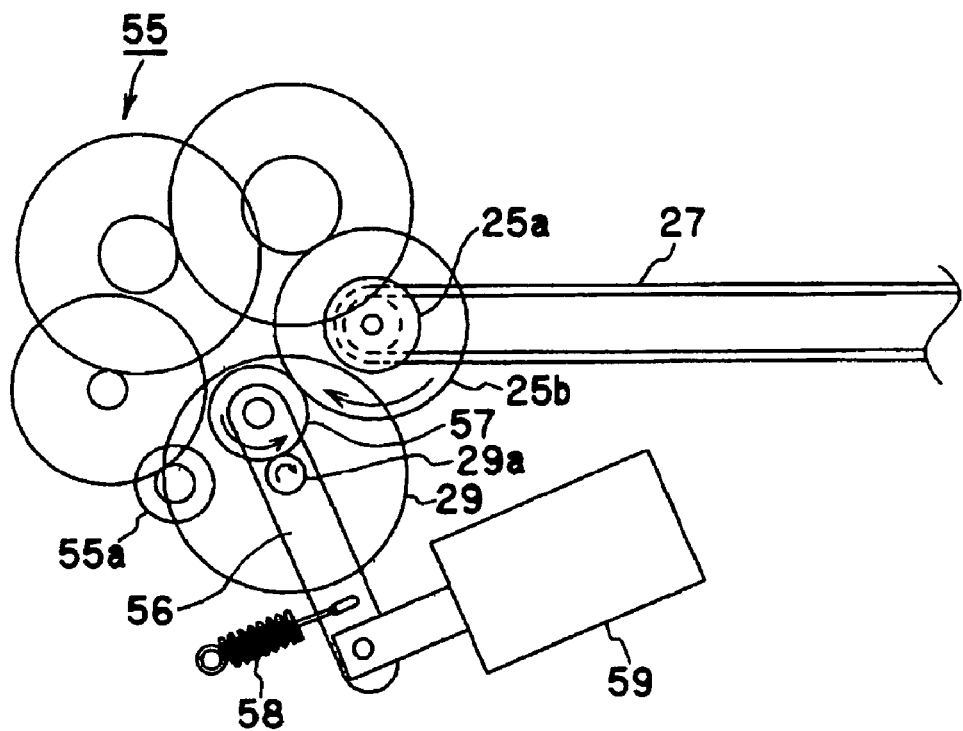
FIGS. 14A and 14B illustrate the driving mechanism of an image reading unit in accordance with the third embodiment of the present invention.
Figure 14B:
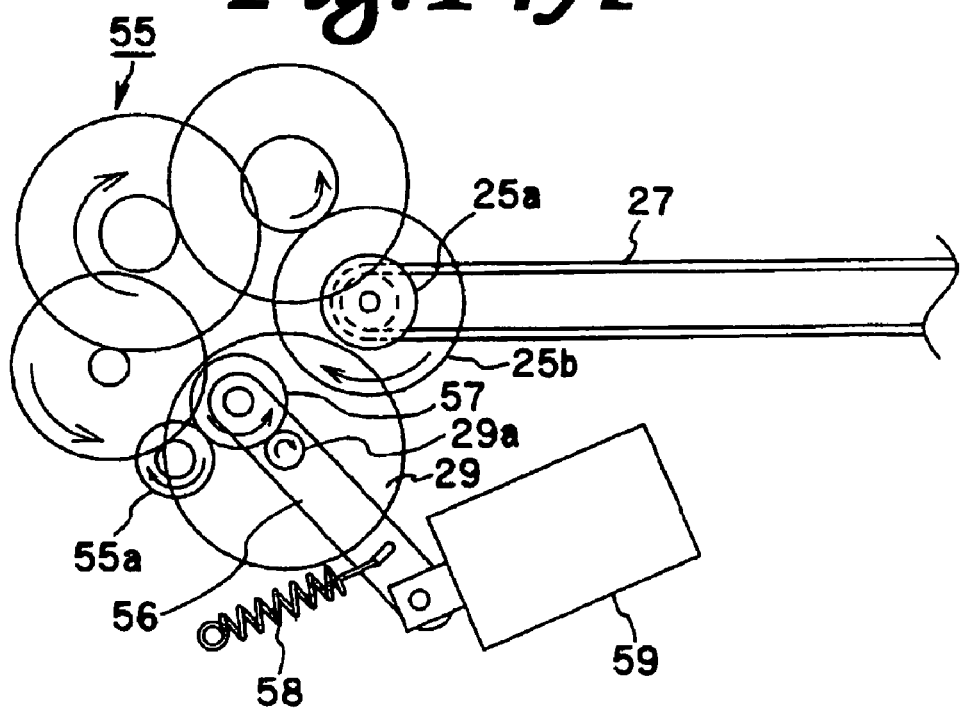

Referring to FIG. 13 and FIGS. 14A and 14B, the method of moving each image reading unit in accordance with the third embodiment is described. Here, an example case of moving the first image reading unit is described. FIG. 13 and FIGS. 14A and 14B illustrate the structure of the driving mechanism for moving the first image reading unit 21.

In the drawings, reference numeral 25b indicates a pulley gear integrally formed with the pulley 25a, and the pulley gear 25b is designed to drive the timing belt 27 joined to the first image reading unit 21. Reference numeral 55 indicates a reduction gear string that is engaged with the pulley gear 25b. Reference numeral 56 indicates a pendulum arm that is rotationally supported about the rotational axis of a pinion gear 29a of the driving motor 29. A driving force transmission gear 57 is axially and rotatably supported at one end of the pendulum arm 56. The pendulum arm 56 is constantly pushed clockwise by a spring 58, and is swung counterclockwise by a solenoid 59.

When the solenoid 59 is not energized, the pendulum arm 56 is pushed clockwise by the spring 58, and the driving force transmission gear 57 is engaged with both the pinion gear 29a of the driving motor 29 and the pulley gear 25b, as shown in FIG. 14A. In this situation, the driving force of the driving motor 29 is transmitted to the pulley gear 25b via the driving force transmission gear 57. This situation is defined as a steady driving state.

When the solenoid 59 is energized, the pendulum arm 56 swings counterclockwise, in spite of the pushing force of the spring 58, and the driving force transmission gear 57 is engaged with both the pinion gear 29a of the driving motor 29 and an input gear 55a of the reduction gear string 55. In this situation, the driving force of the driving motor 29 is transmitted to the pulley gear 25b via the driving force transmission gear 57 and the reduction gear string 55. This situation is defined as a slow driving state.

When image reading is performed in the BOOK mode in the above described structure, the first image reading unit 21 is driven in the steady driving state, and reads the image of a document placed on the platen glass 22 while moving under the platen glass 22.

When image reading is performed in the two-side ADF mode, the first image reading unit 21 is driven below the reading glass 23 in the slow driving state, and reads the image of a document being conveyed on the reading glass 23 while moving under the reading glass 23 at a low speed.

In a case where the image read by the first image reading unit 21 becomes smaller than the image read by the second image reading unit 41, the first image reading unit 21 in the slow driving state is moved in the same direction as the document moving direction, so as to adjust the relative speed of the first image reading unit 21 with respect to the document. Thus, the read image contraction in the sub-scanning direction can be corrected.

In a case where the image read by the first image reading unit 21 becomes larger than the image read by the second image reading unit 41, the first image reading unit 21 in the slow driving state is moved in the opposite direction from the document moving direction, so as to adjust the relative speed of the first image reading unit 21 with respect to the document. Thus, the read image expansion in the sub-scanning direction can be corrected.

In the above description, expansion and contraction of an image read by the first image reading unit 21 with respect to an image read by the second image reading unit 41 are adjusted. In such a case, the number of rotations of the driving motor that drives the first conveying unit 46, the second conveying unit 48, and the third conveying unit 51 is adjusted so that the document conveying speed in the reading position of the second image reading unit 41 becomes equal to the ideal document conveying speed $V_0$. In this manner, expansion and contraction with respect to the original are not caused in the image read by the second image reading unit 41. Accordingly, expansion and contraction with respect to the original are not caused either in the image that is read by the first image reading unit 21 and is corrected with respect to the image read by the second image reading unit 41.

As described above, in the third embodiment, expansion and contraction of an image read from the front surface or the back surface of a document can be corrected by a mechanical means. Thus, expansion and contraction of an image read from the front surface or the back surface of a document can be corrected without the use of an electric means.

In the third embodiment, the first image reading unit 21 reads an image while moving in the ADF mode. Therefore, the moving mechanism of the first image reading unit 21 in the BOOK mode and the moving mechanism of the first image reading unit 21 in the ADF mode share at least a component. Accordingly, the apparatus can be made smaller, and the production cost can be lowered.

Although the first image reading unit 21 is moved in the third embodiment, the second image reading unit may be moved instead. It is of course also possible to move both the first and second image reading units.

In the third embodiment, the first image reading unit 21 is moved at two speed levels: the steady driving state and the slow driving state. However, it is also possible to employ a variable gear string with three or more speed levels in accordance with changes in document conveying speed.

Also in the third embodiment, switching between the stead driving state and the slow driving state is performed by switching the driving gear string for the single driving motor 29. However, using a speed-variable motor in place of the driving motor 29, the rotation speed of the driving motor is varied to switch the moving speeds of the image reading unit. Further, a driving motor for slow driving may be employed independently, and the driving sources for the pulley gear 25b may be selectively switched.

Figures 15A, 15B:
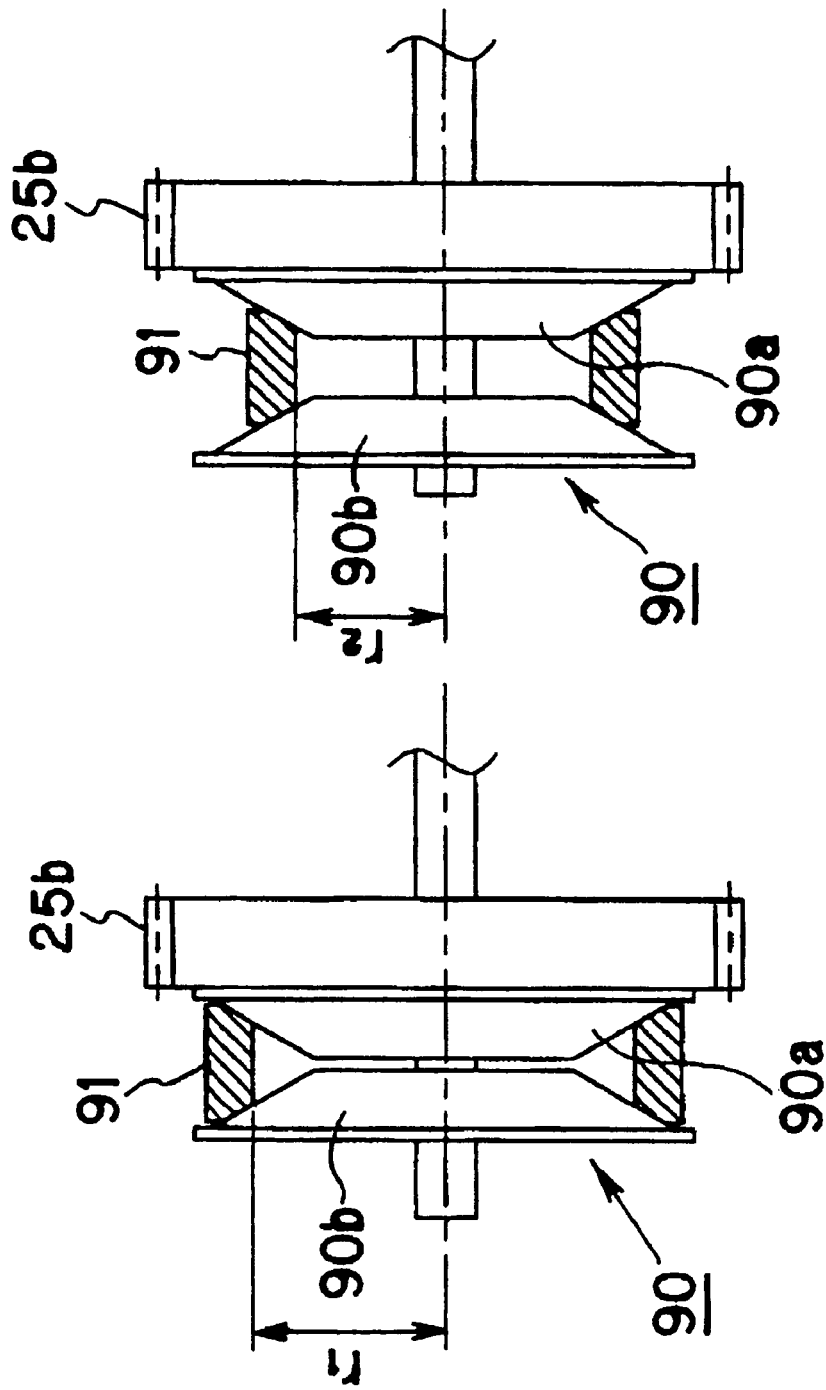
FIGS. 15A and 15B illustrate the driving mechanism of an image reading unit in accordance with the third embodiment of the present invention.

A non-step variable mechanism may be employed in place of the pulley 25a shown in FIG. 3. The non-step variable mechanism includes an evenly divided pulley 90 and a V belt 91 as shown in FIGS. 15A and 15B, and changes the speed by varying the distance between two plates 90a and 90b constituting the pulley 90.

The stepwise speed switching can be suitably performed in cases where the document conveying speed in the reading position of each document reading unit is known, as in a case where document conveying speeds are purposely varied.

Fourth Embodiment

In each image reading apparatus in accordance with the first through third embodiments, expansion and contraction of a read image in the sub-scanning direction are entirely corrected. In the fourth embodiment, on the other hand, correction is performed more microscopically, and expansion and contraction of a read image in the sub-scanning direction are partially corrected.

As described above, the first image reading unit for reading the image of the front surface of a document and the second image reading unit for reading the image of the back surface of the document are disposed at different locations with respect to the document conveying direction. Therefore, the combination of conveying units conveying a document when an image is being read by the first image reading unit is completely different from the combination of conveying units conveying a document when an image is being read by the second image reading unit.

Accordingly, expansion and contraction of a read image caused by a change in document conveying speed due to the difference in combination of conveying units are relatively conspicuous between the front surface and the back surface. However, strictly speaking, the combination of conveying units conveying a document can be changed while the image of the document is being read by an image reading unit. As a result, the document conveying speed somewhat changes during a document reading operation. With attention being paid to this fact, the apparatus is designed so that partially caused expansion and contraction of a read image can be corrected in the fourth embodiment. It should be noted that the other aspects of the structure and functions of this embodiment are the same as those of the first embodiment, and therefore, explanation of them is omitted herein.

In the first embodiment, the document conveying speed during an image reading operation by the first image reading unit 21 is controlled by the first conveying unit 46 and the second conveying unit 48. In a case where the document conveying speed of the first conveying unit 46 differs from the document conveying speed of the second conveying unit 48, however, the document conveying speed between the start and the end of the reading varies. During an image reading operation by the first image reading unit 21, the document conveying speed is controlled only by the first conveying unit 46 from the start of the reading and until the top of the document reaches the second conveying unit 48 (this document conveying speed will be hereinafter referred to as the first document reading speed V1). After the document reaches the second conveying unit 48, the document conveying speed is controlled by both the first conveying unit 46 and the second conveying unit 48 (this document conveying speed will be hereinafter referred to as the second document conveying speed V2). As the document is further conveyed and the bottom end of the document passes through the nip of the first conveying unit 46, the document conveying speed is controlled only by the second conveying unit 48 (this document conveying speed will be hereinafter referred to as the third document conveying speed V3).

Therefore, there are differences among the read image expansion and contraction caused during the conveyance at the first document conveying speed V1, the read image expansion and contraction caused during the conveyance at the second document conveying speed V2, and the read image expansion and contraction caused during the conveyance at the third document conveying speed V3. Depending on the length of the document, the top of the document might reach the nip of the third conveying unit 51 before the bottom of the document passes through the nip of the first conveying unit 46. In such a case, the document conveying speed is controlled by the first conveying unit 46, the second conveying unit 48, and the third conveying unit 51 (this document conveying speed will be hereinafter referred as the fourth document conveying speed V4).

As the document is further conveyed and the bottom end of the document passes through the nip of the first conveying unit 46, the document conveying speed is controlled by the second conveying unit 48 and the third conveying unit 51 (this document conveying speed will be hereinafter referred to as the fifth document conveying speed V5). As the document is further conveyed and the bottom end of the document passes through the nip of the second conveying unit 48, the document conveying speed is controlled only by the third conveying unit 51 (this document conveying speed will be hereinafter referred to as the sixth document conveying speed V6).

In the fourth embodiment, read image expansion and contraction correction is performed on the first image reading unit 21 and the second image reading unit 41, using correction amounts in accordance with each conveying speed during the conveyance at the first document conveying speed V1, during the conveyance at the second document conveying speed V2, during the conveyance at the third document conveying speed V3, during the conveyance at the fourth document conveying speed V4, during the conveyance at the fifth document conveying speed V5, and during the conveyance at the sixth document conveying speed V6.

As will be described later, during an image reading operation by the first image reading unit 21, the document conveying speed might vary among the four levels of the first conveying speed V1, the second conveying speed V2, the fourth conveying speed V4, and the fifth conveying speed V5. Also, during an image reading operation by the first image reading unit 21, the document conveying speed might vary among the four levels of the first conveying speed V1, the second conveying speed V2, the third conveying speed V3, and the fifth conveying speed V5.

Meanwhile, during an image reading operation by the second image reading unit 41, the document conveying speed might vary among the four levels of the second conveying speed V2, the fourth conveying speed V4, the fifth conveying speed V5, and the sixth conveying speed V6. Also, during an image reading operation by the second image reading unit 41, the document conveying speed might vary among the four levels of the second conveying speed V2, the third conveying speed V3, the fifth conveying speed V5, and the sixth conveying speed V6.

In the fourth embodiment, read image expansion and contraction are corrected in accordance with the changes in conveying speed. As for the correcting method, any of the methods of the first through third embodiments may be implemented.

In a case where the expansion and contraction correcting method of the first embodiment is implemented, for example, image expansion and contraction are corrected by increasing or decreasing the number of transfer pulses for transferring the image data of each one line. Here, partial image expansion and contraction can be corrected by changing the transfer pulse increase or decrease amount (the correction value, hereinafter referred to as the correction value) in accordance with the conveying speed.

In the first image reading unit 21, partial image expansion and contraction correction can be performed by switching the correction value to a first correction value J1 during the conveyance at the first document conveying speed V1, to a second correction value J2 during the conveyance at the second document conveying speed V2, to a third correction value J3 during the conveyance at the third document conveying speed V3, to a fourth correction value J4 during the conveyance at the fourth document conveying speed V4, and to a fifth correction value J5 during the conveyance at the fifth document conveying speed V5.

In the second image reading unit 41, partial image expansion and contraction correction can be performed by switching the correction value to a first correction value K1 during the conveyance at the second document conveying speed V2, to a second correction value K2 during the conveyance at the third document conveying speed V3, to a third correction value K3 during the conveyance at the fourth document conveying speed V4, to a fourth correction value K4 during the conveyance at the fifth document conveying speed V5, and to a fifth correction value K5 during the conveyance at the sixth document conveying speed V6.

Referring now to the flowcharts of FIGS. 16 through 19, the timing of switching image corrections is described.

Figure 16:
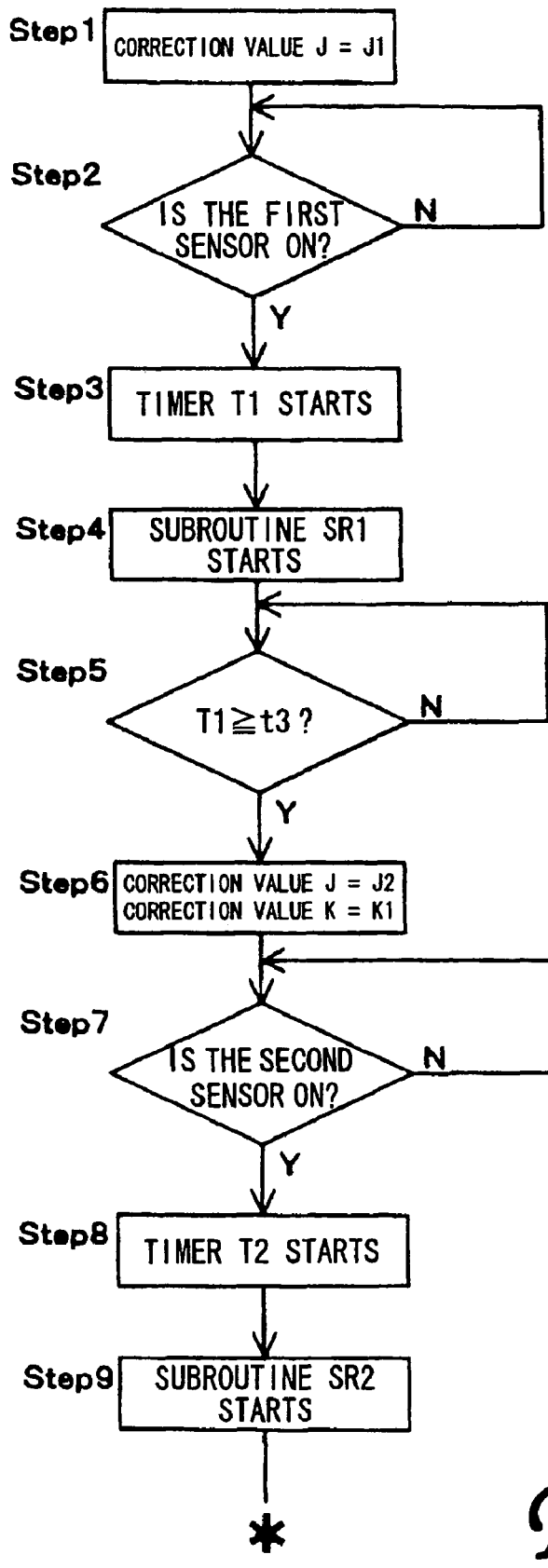
FIG. 16 is a flowchart of the procedures for controlling image expansion and contraction correction in an image reading unit in accordance with a fourth embodiment of the present invention.

First, when the top end of a document reaches the nip position of the first conveying unit 46, the document is conveyed by the first conveying unit 46 at the first document conveying speed V1. Here, as shown in the flowchart of FIG. 16, the correction value is the first correction value J1 (Step 1). The controller monitors the first document edge sensor 47 (Step 2). When the first document edge sensor 47 detects the top end of the document, a timer T1 is activated (Step 3), and the subroutine SR1 shown in FIG. 18 starts to run in parallel (Step 4), so as to control the start and the end of the reading operation of the first image reading unit 21.

After the top end of the document reaches the nip position of the first conveying unit 46, the document is conveyed only by the first conveying unit 46 until the top end of the document reaches the nip position of the second conveying unit 48. Therefore, for the first image reading unit 21, image expansion and contraction are corrected with the first correction value J1, as described above. When the timer T1 reaches time t3, the top end of the document is determined to have reached the nip position of the second conveying unit 48, and the correction value for correcting image expansion and contraction caused with the first image reading unit 21 is switched from the first correction value J1 to the second correction value J2 (Step 6). Here, the document is conveyed by both the first conveying unit 46 and the second conveying unit 48. Therefore, image expansion and contraction are corrected with the second correction value J2.

Meanwhile, the correction value for correcting image expansion and contraction caused with the second image reading unit 41 is set at the first correction value K1 (Step 6). The time t3 is the time lapsed since the first document edge sensor 47 detects the top end of the document until the top end of the document reaches the nip position of the second conveying unit 48. The time t3 can be determined by the first conveying speed V1 and the sheet path length from the detecting position of the first document edge sensor 47 to the nip position of the second conveying unit 48.

The controller then monitors the condition of the second document edge sensor 49 (Step 7). If the second document edge sensor 49 is in an OFF state, the operation returns to Step 7. If the second document edge sensor 49 is determined to be in an ON state in Step 7, a timer T2 is activated (Step 8), and the subroutine SR2 shown in FIG. 19 starts to run in parallel (Step 9), so as to control the start and the end of the reading operation of the second image reading unit 41.

Figure 17:
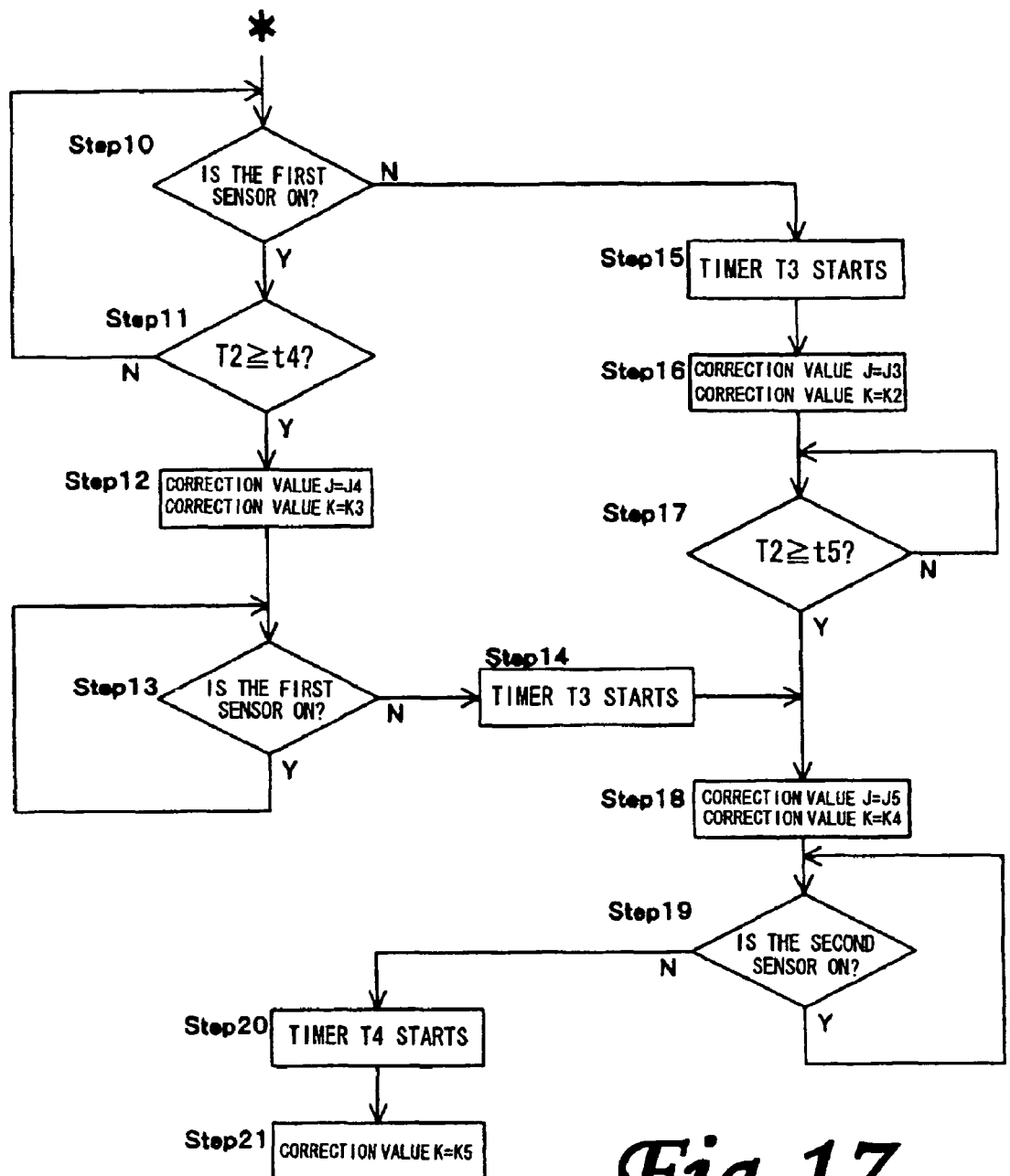
FIG. 17 is a flowchart of the procedures for controlling image expansion and contraction correction in an image reading unit in accordance with a fourth embodiment of the present invention.
Figure 18:
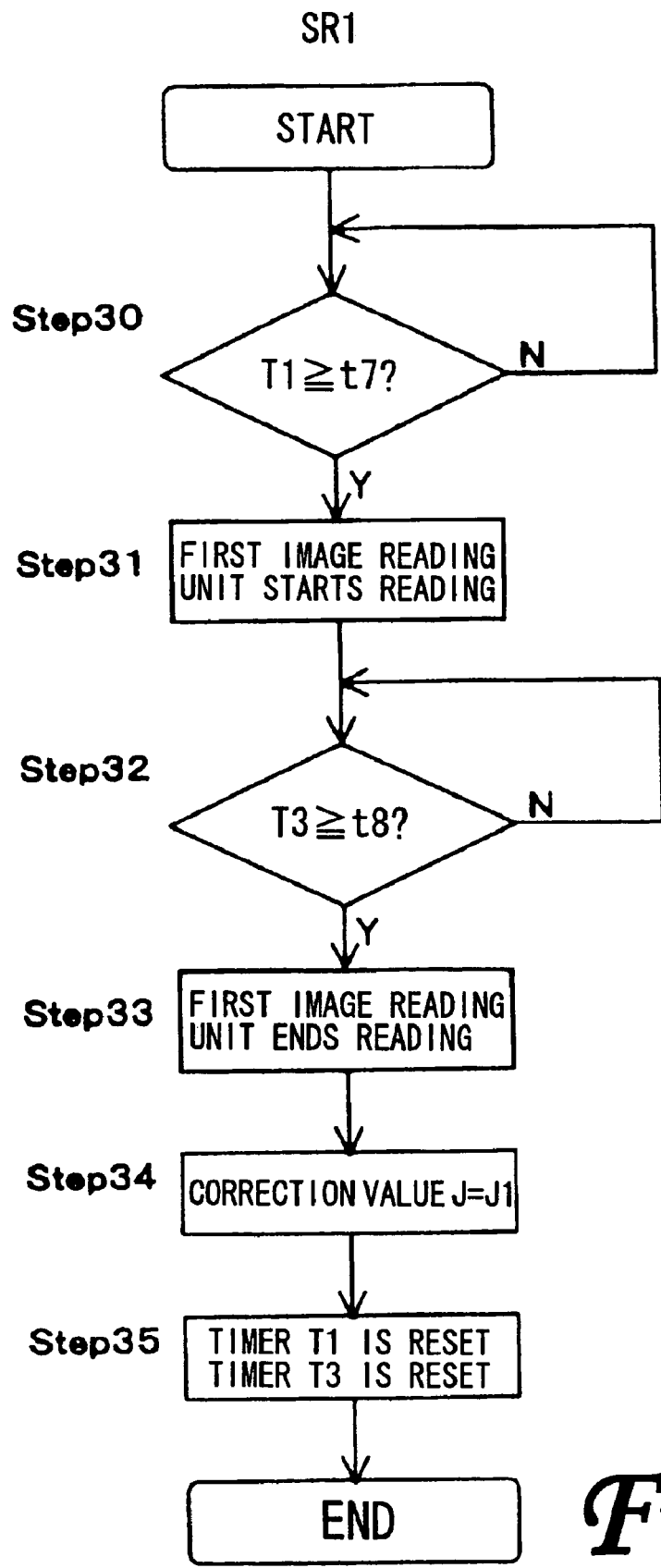
FIG. 18 is a flowchart of the procedures for controlling the start and the end of reading by the first image reading unit.
Figure 19:
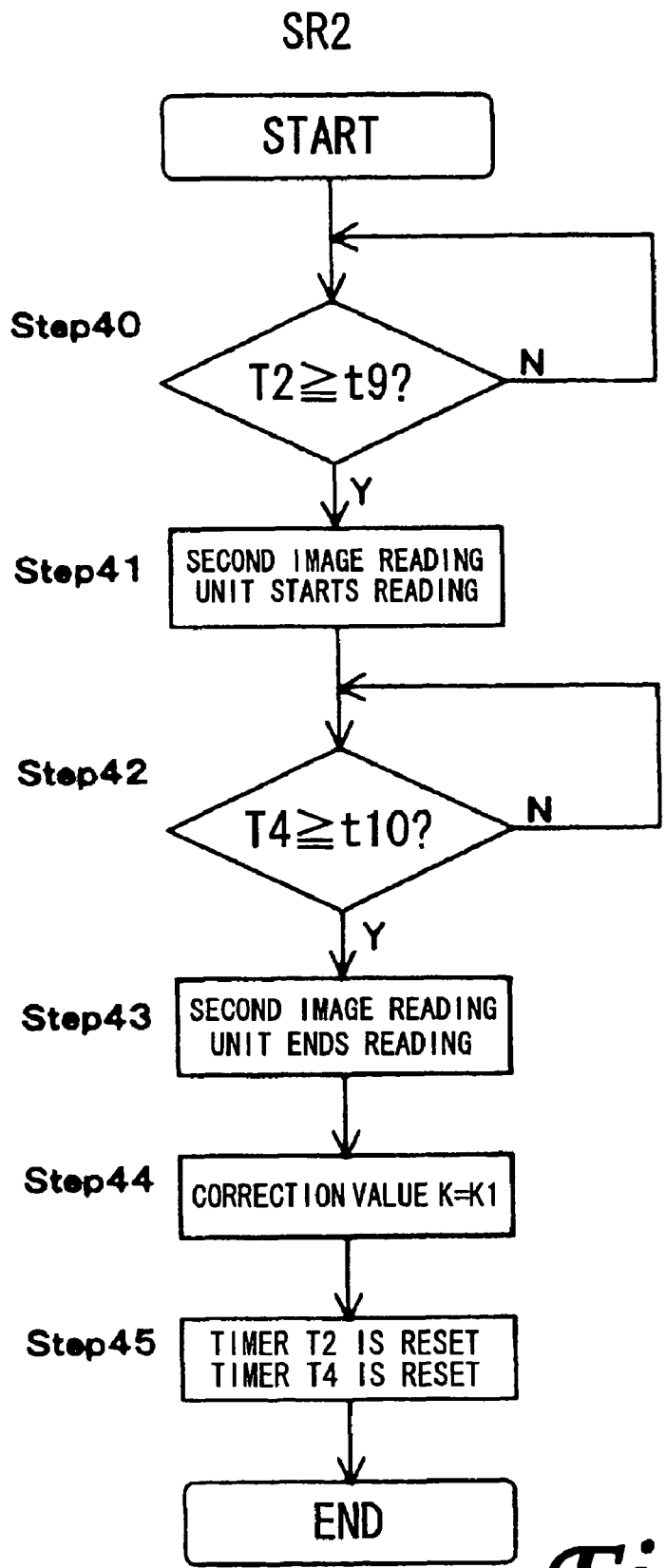
FIG. 19 is a flowchart of the procedures for controlling the start and the end of reading by the second image reading unit.
Figure 20:
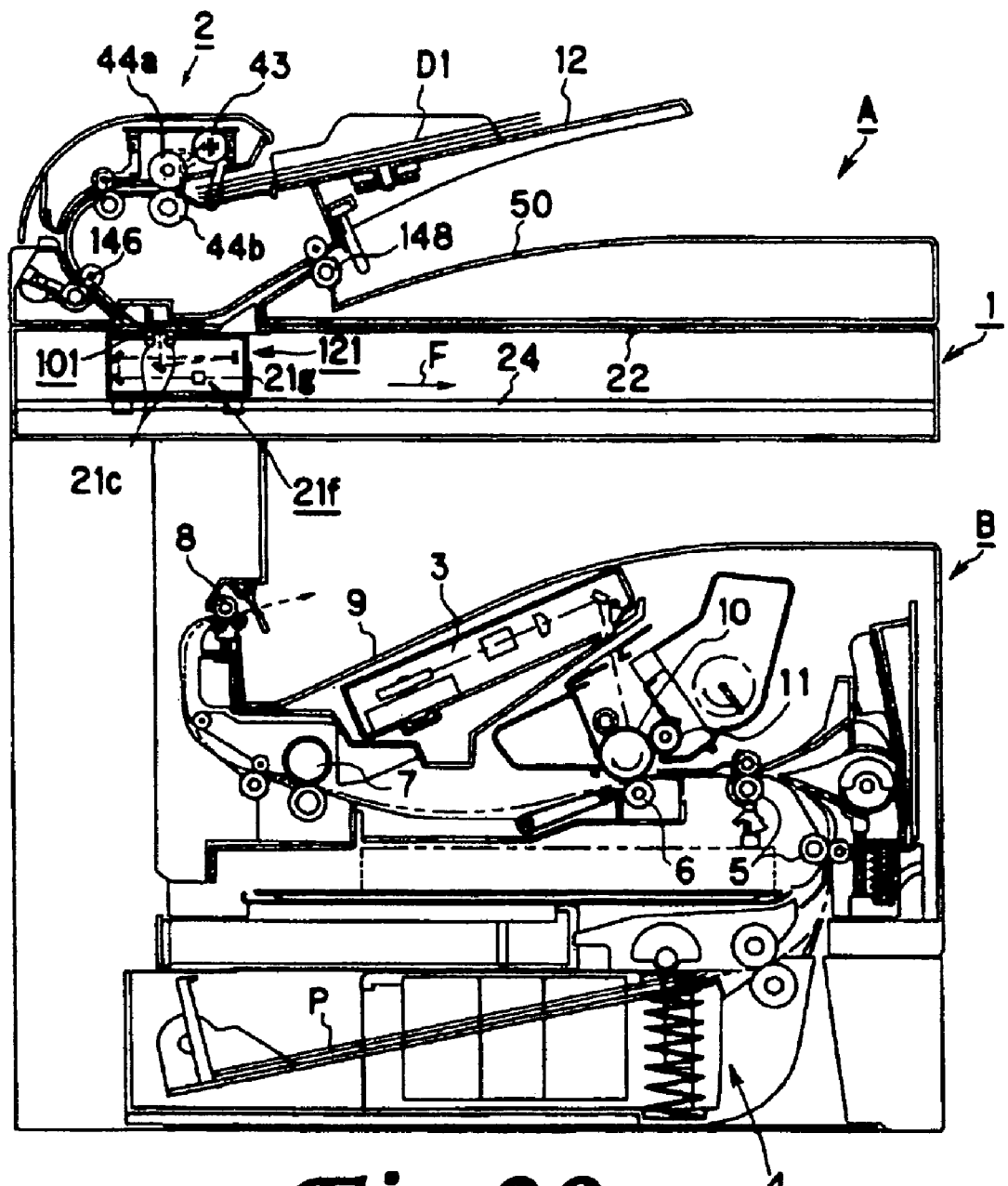
FIG. 20 is a schematic view of an image forming apparatus that is equipped with a conventional image reading apparatus.
Figure 21:
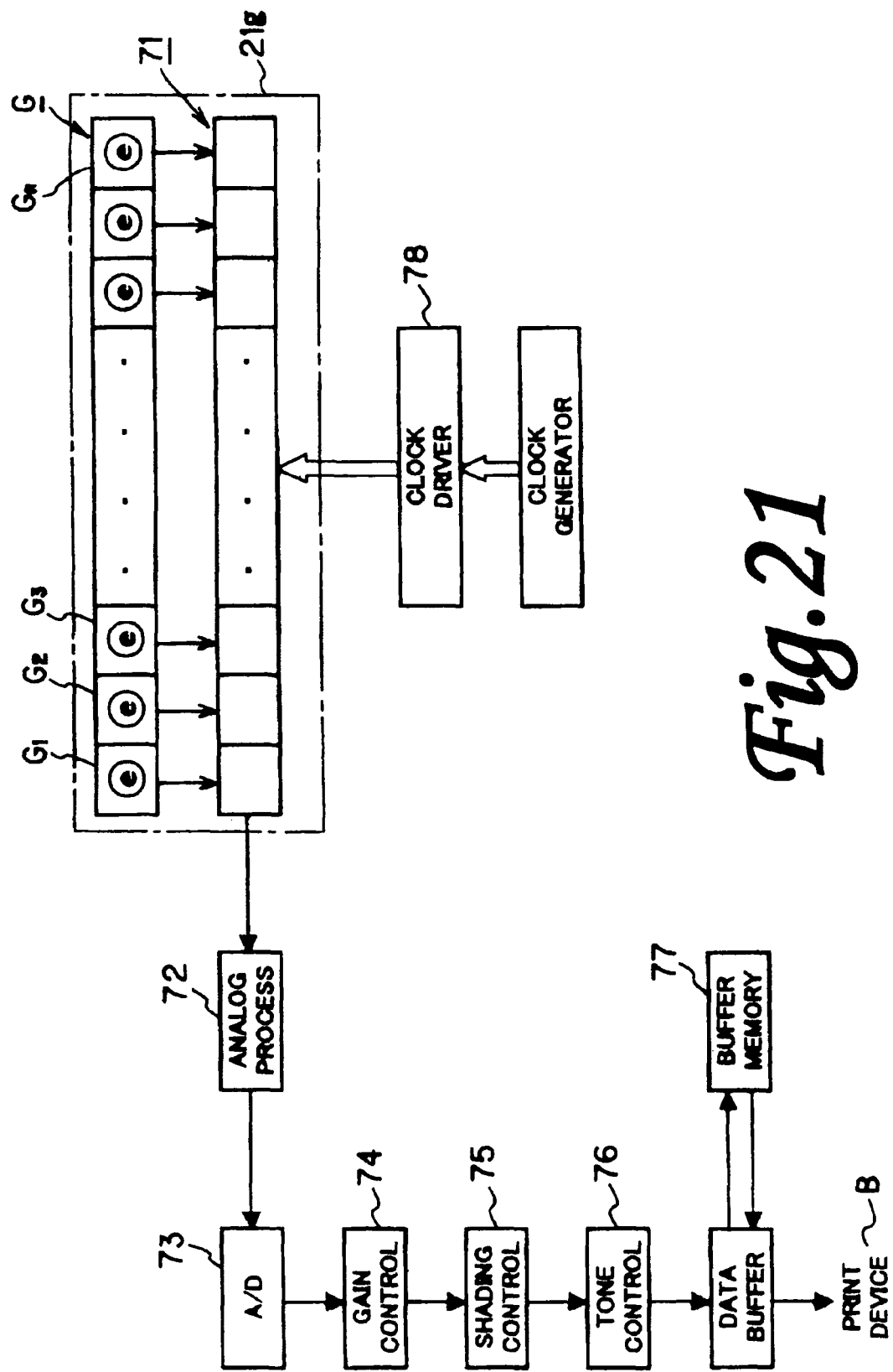
FIG. 21 is a block diagram of the image processor of a conventional image reading unit.
Figure 22A:
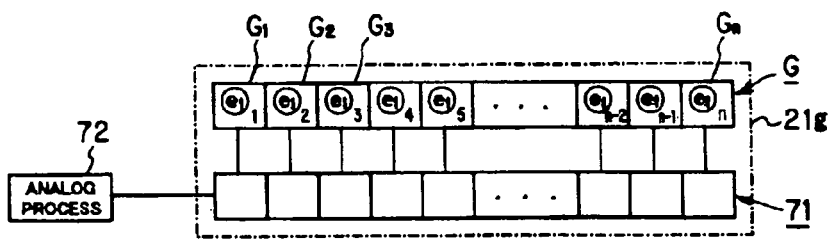
FIGS. 22A through 22D illustrate CCD charge transfer in the prior art.
Figure 22B:
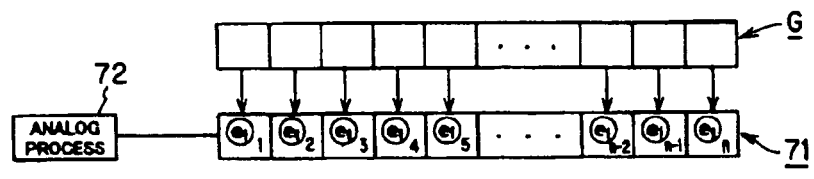
Figure 22C:
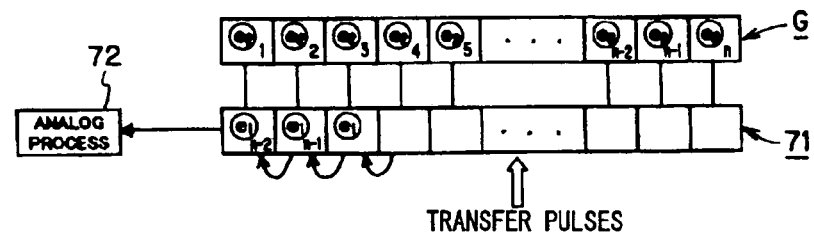
Figure 22D:
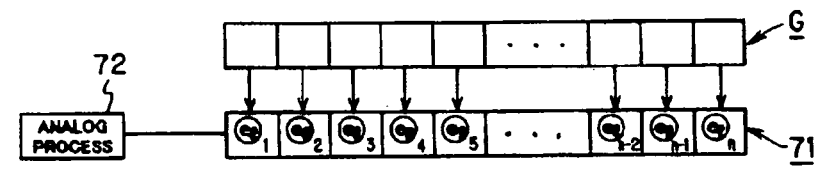

As shown in the flowchart of FIG. 17, the controller monitors the first document edge sensor 47 (Step 10). If the first document edge sensor 47 is in an ON state, the bottom end of the document is determined not to have passed through the nip of the first conveying unit 46, and the controller monitors the timer T2 (Step 11). If the timer T2 has not reached time t4 in Step 11, the operation returns to Step 10.

If the timer T2 has reached the time t4 in Step 11, the controller determiners that the top end of the document has reached the nip position of the third conveying unit 51, and the correction value for correcting image expansion and contraction caused with the first image reading unit 21 is switched from the second correction value J2 to the fourth correction value J4. Also, the correction value for correcting image expansion and contraction caused with the second image reading unit 41 is switched from the first correction value K1 to the third correction value K3 (Step 12).

Since the document is being conveyed by the first conveying unit 46, the second conveying unit 48, and the third conveying unit 51 at this point, the fourth correction value J4 is used as the correction value for correcting image expansion and contraction caused with the first image reading unit 21, and the third correction value K3 is used as the correction value for correcting image expansion and contraction caused with the second image reading unit 41. The time t4 is the time lapsed since the second document edge sensor 49 detects the top end of the document until the top end of the document reaches the nip position of the third conveying unit 51. The time t4 can be determined by the second document conveying speed V2 and the sheet path length from the detecting position of the second document edge sensor 49 to the nip position of the third conveying unit 51.

The controller then monitors the condition of the first document edge sensor 47 (Step 13). If the first document edge sensor 47 is in an ON state, Step 13 is repeated. If the first document edge sensor 47 is determined to be in an OFF state in Step 13, the controller determines that the bottom end of the document has passed through the nip of the first conveying unit 46, and a timer T3 is activated (Step 14). At the time same, the correction value for correcting image expansion and contraction caused with the first image reading unit 21 is switched from the fourth correction value J4 to the fifth correction value J5, and the correction value for correcting image expansion and contraction caused with the second image reading unit 41 is switched from the third correction value K3 to the fourth correction value K4 (Step 18).

Since the document is being conveyed by both the second conveying unit 48 and the third conveying unit 51 at this point, the fifth correction value J5 is used as the correction value for correcting image expansion and contraction caused with the first image reading unit 21, and the fourth correction value K4 is used as the correction value for correcting image expansion and contraction caused with the second image reading unit 41. The controller then monitors the condition of the second document edge sensor 49 (Step 19). If the second document edge sensor 49 is in an ON sate, Step 19 is repeated.

If the second document edge sensor 49 is determined to be in an OFF state in Step 19, the controller determines that the bottom end of the document has passed through the nip of the second conveying unit 48, and a timer T4 is activated (Step 20). At the same time, the correction value for correcting image expansion and contraction caused with the second image reading unit 41 is switched from the fourth correction value K4 to the fifth correction value K5 (Step 21). Since the document is being conveyed only by the third conveying unit 51 at this point, the fifth correction value K5 is used as the correction value for correcting image expansion and contraction caused with the second image reading unit 41.

Meanwhile, if the first document edge sensor 47 is determined to be in an OFF state in Step 10, the controller determines that the bottom end of the document has passed through the nip of the first conveying unit 46, and the timer T3 is activated (Step 15). Further, the correction value for correcting image expansion and contraction caused with the first image reading unit 21 is switched from the second correction value J2 to the third correction value J3, and the correction value for correcting image expansion and contraction caused with the second image reading unit 41 is switched from the first correction value K1 to the second correction value K2 (Step 16).

Since the document is being conveyed only by the second conveying unit 48 at this point, the third correction value J3 is used as the correction value for correcting image expansion and contraction caused with the first image reading unit 21, and the second correction value K2 is used as the correction value for correcting image expansion and contraction caused with the second image reading unit 41. The controller then monitors the timer T2 (Step 17). If the timer T2 has not reached time t5, the controller determines that the top end of the document has not reached the nip of the third conveying unit 51, and Step 17 is repeated. If the timer T2 has reached the time t5 in Step 17, the controller determines that the top end of the document has reached the nip of the third conveying unit 51, and the correction value for correcting image expansion and contraction caused with the first image reading unit 21 is switched from the third correction value J3 to the fifth correction value J5. Also, the correction value for correcting image expansion and contraction caused with the second image reading unit 41 is switched from the second correction value K2 to the fourth correction value K4 (Step 18).

Since the document is being conveyed by both the second conveying unit 48 and the third conveying unit 51 at this point, the fifth correction value J5 is used as the correction value for correcting image expansion and contraction caused with the first image reading unit 21, and the fourth correction value K4 is used as the correction value for correcting image expansion and contraction caused with the second image reading unit 41. The time t5 is the time lapsed since the second document edge sensor 49 detects the top end of the document until the top end of the document reaches the nip position of the third conveying unit 51. The time t5 can be determined by the third document conveying speed V3 and the sheet path length from the detecting position of the second document edge sensor 49 to the nip position of the third conveying unit 51.

The controller then monitors the condition of the second document edge sensor 49 (Step 19). If the second document edge sensor 49 is in an ON sate, Step 19 is repeated. If the second document edge sensor 49 is determined to be in an OFF state in Step 19, the controller determines that the bottom end of the document has passed through the nip of the second conveying unit 48, and the timer T4 is activated (Step 20). At the same time, the correction value for correcting image expansion and contraction caused with the second image reading unit 41 is switched from the fourth correction value K4 to the fifth correction value K5 (Step 21). Since the document is being conveyed only by the third conveying unit 51 at this point, the fifth correction value K5 is used as the correction value for correcting image expansion and contraction caused with the second image reading unit 41.

Next, the subroutine SR1 is described. As already known, the start of a reading operation by the first image reading unit 21 is determined by measuring the timing of the top end of the document reaching the reading position. Therefore, the controller monitors the timer T1 that is activated when the first document edge sensor 47 located on the upstream side of the first image reading unit 21 detects the top end of the document (Step 30). When the timer T1 reaches time t7, the controller determines that the top end of the document has reached the reading position of the first image reading unit 21, and starts the image reading operation by the first image reading unit 21 (Step 31). The time t7 can be determined by the first document conveying speed V1 and the sheet path length from the detecting position of the first document edge sensor 47 to the reading position of the first image reading unit 21.

The controller then monitors the condition of the first document edge sensor 47 in Step 10 or Step 13. If the first document edge sensor 47 is determined to be in an OFF state in Step 10 or Step 13, the controller determines that the bottom end of the document has passed through the nip of the first conveying unit 46, and activates the timer T3 in Step 15 or Step 14. The controller monitors the timer T3 (Step 32). When the timer T3 reaches time t8, the controller determines that the bottom end of the document has reached the reading position of the first image reading unit 21, and ends the image reading operation by the first image reading unit 21 (Step 33). The correction value for the first image reading unit 21 is then returned to the first correction value J1 (Step 34), and the timer T1 and the timer T3 are reset (Step 35). The subroutine SR1 then comes to an end.

Next, the subroutine SR2 is described. As already known, the start of a reading operation by the second image reading unit 41 is determined by measuring the timing of the top end of the document reaching the reading position. Therefore, the controller monitors the timer T2 that is activated when the second document edge sensor 49 located on the upstream side of the second image reading unit 41 detects the top end of the document (Step 40). When the timer T2 reaches time t9, the controller determines that the top end of the document has reached the reading position of the second image reading unit 41, and starts the image reading operation by the second image reading unit 41 (Step 41). The time t9 can be determined by the sheet path length from the detecting position of the second document edge sensor 49 to the reading position of the second image reading unit 41, as well as both the second conveying speed V2 and the third conveying speed V3 or only the second conveying speed V2.

The controller then monitors the condition of the second document edge sensor 49 in Step 19. If the second document edge sensor 49 is in an OFF state, the controller determines that the bottom end of the document has passed through the nip of the second conveying unit 48, and activates the timer T4 (Step 20). When the timer T4 reaches time t10, the controller determines that the bottom end of the document has reached the reading position of the second image reading unit 41, and ends the image reading operation by the second image reading unit 41 (Step 43). The time t10 is determined by the sixth conveying speed V6 and the sheet path length from the detecting position of the second document edge sensor 49 to the reading position of the second image reading unit 41. The correction value for the second image reading unit 41 is then returned to the first correction value K1 (Step 44), and the timer T2 and the timer T4 are reset (Step 45). The subroutine SR2 then comes to an end.

As described above, read image expansion and contraction correction is performed on the first image reading unit 21 and the second image reading unit 41, using correction amounts in accordance with each conveying speed during the conveyance at the first document conveying speed V1, during the conveyance at the second document conveying speed V2, during the conveyance at the third document conveying speed V3, during the conveyance at the fourth document conveying speed V4, during the conveyance at the fifth document conveying speed V5, and during the conveyance at the sixth document conveying speed V6. Thus, partial image expansion and contraction correction can be performed.

Although the read image expansion and contraction correcting method of the first embodiment is implemented in the correcting operation involving both the first image reading unit 21 and the second image reading unit 41 in the fourth embodiment, the present invention is not limited to that case. Rather, the expansion and contraction correction may be performed only on an image read by the first image reading unit 21 or only on an image read by the second image reading unit 41.

Furthermore, the expansion and contraction correcting method of the second embodiment or the third embodiment may be implemented.

This application claims priority from Japanese Patent Application No. 2005-057792 filed Mar. 2, 2005, which is hereby incorporated by reference, herein.

What is claimed is:

1. An image reading apparatus comprising:
a plurality of conveying units configured to convey a document;
a first image reading unit configured to read an image from a document in a stationary state on an original base plate, and to read an image from one surface of a document that is being conveyed by at least one of the plurality of conveying units, the first image reading unit being designed to be movable; and
a second image reading unit configured to read an image from the other surface of the document being conveyed by at least one of the plurality of conveying units,
wherein the first image reading unit moves while reading the image from the document being conveyed so that the relative speed between the first image reading unit and the document and the relative speed between the second image reading unit and the document become equal to each other, in accordance with a change in document conveying speed caused by the difference between a combination of the plurality of conveying units conveying the document during a reading operation performed by the first image reading unit and a combination of conveying units conveying the document during a reading operation performed by the second image reading unit.

2. An image reading apparatus as claimed in claim 1, wherein the combination of the plurality of conveying units conveying the document is determined by the document conveying speed and the positional relationship between a detection sensor and the conveying units, based on a detection signal from the detection sensor that detects at least one of the leading edge top end or the trailing edge bottom of the document being conveyed.

3. An image reading apparatus as claimed in claim 1, wherein the combination of the plurality of conveying units conveying the document is determined by the document conveying speed and the positional relationship between a detection sensor and the conveying units, based on a detection signal from the detection sensor that detects at least one of the leading edge or the trailing edge of the document being conveyed.

* * * * *